United States Patent
Kawaguchi et al.

(10) Patent No.: US 9,503,699 B2
(45) Date of Patent: Nov. 22, 2016

(54) IMAGING DEVICE, IMAGING METHOD, ELECTRONIC DEVICE, AND PROGRAM

(71) Applicant: Sony Corporation, Tokyo (JP)

(72) Inventors: Shunji Kawaguchi, Kanagawa (JP); Isao Hirota, Kanagawa (JP); Hideki Shoyama, Fukuoka (JP)

(73) Assignee: Sony Corporation, Tokyo (JP)

( * ) Notice: Subject to any disclaimer, the term of this patent is extended or adjusted under 35 U.S.C. 154(b) by 82 days.

(21) Appl. No.: 14/395,961

(22) PCT Filed: May 1, 2013

(86) PCT No.: PCT/JP2013/062720
§ 371 (c)(1),
(2) Date: Oct. 21, 2014

(87) PCT Pub. No.: WO2013/172205
PCT Pub. Date: Nov. 21, 2013

(65) Prior Publication Data
US 2015/0138407 A1 May 21, 2015

(30) Foreign Application Priority Data

May 14, 2012 (JP) ................................. 2012-110323

(51) Int. Cl.
*H04N 9/04* (2006.01)
*H04N 5/357* (2011.01)
(Continued)

(52) U.S. Cl.
CPC .............. *H04N 9/045* (2013.01); *H04N 5/347* (2013.01); *H04N 5/3456* (2013.01); *H04N 5/357* (2013.01); *H04N 5/378* (2013.01); *H04N 5/37455* (2013.01); *H04N 5/37457* (2013.01)

(58) Field of Classification Search
CPC .... H04N 9/045; H04N 5/3456; H04N 5/347; H04N 5/34757; H04N 5/34755; H04N 5/378
USPC ....... 348/281, 276, 277, 278, 294, 301, 302, 348/379
See application file for complete search history.

(56) References Cited

U.S. PATENT DOCUMENTS

2007/0115377 A1   5/2007  Noda et al.
2010/0141812 A1*  6/2010  Hirota ................... H04N 9/045
                                              348/279
(Continued)

FOREIGN PATENT DOCUMENTS

JP   2006-033454 A   2/2006
JP   2007-166600 A   6/2007
(Continued)

OTHER PUBLICATIONS

Chinese Office Action issued Dec. 21, 2015 for corresponding Chinese Application No. 201380023738.3.
(Continued)

*Primary Examiner* — Nhan T Tran
(74) *Attorney, Agent, or Firm* — Michael Best & Friedrich LLP

(57) ABSTRACT

The present technique relates to an imaging device and an imaging method, an electronic device, and a program, which are configured to improve an SN ratio by combining addition reading and thin-out reading by signal processing similar to signal processing using thin-out reading.

First, as illustrated in the left side of the drawing, G pixel and B pixel, which are sub-colors, of the top row of regions Z1, Z2 are subjected to thin-out reading. Next, for W pixels of the main color arranged in a checkerboard pattern in the regions Z1, Z2, two pixels tied by a straight line in the drawing are subjected to addition reading at the same tone timing. For W pixels of the main color arranged in a checkerboard pattern in regions Z3, Z4, two pixels tied by a straight line in the drawing are also subjected to addition reading at the same tone timing. R and G pixels, which are sub-colors, of the lower stage of the regions Z3, Z4 are read. According to a relative relation between the main color and the sub-colors of the regions Z1 to Z4 as illustrated in the center of the drawing, Bayer arrangement is obtained as illustrated in the right side of the drawing. The present technique can be applied to an imaging device.

17 Claims, 14 Drawing Sheets

(51) Int. Cl.
*H04N 5/374* (2011.01)
*H04N 5/378* (2011.01)
*H04N 5/3745* (2011.01)
*H04N 5/345* (2011.01)
*H04N 5/347* (2011.01)

(56) References Cited

U.S. PATENT DOCUMENTS

2011/0054911 A1 3/2011 Baumgarte et al.
2011/0058075 A1* 3/2011 Yanagita ............... H04N 9/045
 348/273
2013/0075588 A1* 3/2013 Kawaguchi ........ H04N 5/37455
 250/208.1

FOREIGN PATENT DOCUMENTS

| JP | 2010-136225 A | 6/2010 |
| JP | 4626706 B2 | 11/2010 |
| JP | 2011-054911 A | 3/2011 |
| JP | 2011-097568 A | 5/2011 |

OTHER PUBLICATIONS

International Search Report; International Application No. PCT/JP2013/062720; Filing Date: May 1, 2013. (Form PCT/ISA/210).
Written Opinion of the International Searching Authority; International Application No. PCT/JP2013/062720; Dated:Jun. 11, 2013. (Form PCT/ISA/220 and PCT/ISA/237).

* cited by examiner

IMAGING DEVICE, IMAGING METHOD, ELECTRONIC DEVICE, AND PROGRAM

TECHNICAL FIELD

The present technique relates to an imaging device, an imaging method, an electronic device, and a program. More particularly, the present technique relates to an imaging device, an imaging method, an electronic device, and a program, which are configured to restrict reduction of a signal to noise ratio, minimize decrease of resolution, and improve sensitivity of pixel signals by high speed processing.

BACKGROUND ART

The present invention relates to an imaging device, such as a digital still camera and a digital video camera, and signal processing.

In a solid state image sensor, such as a complementary metal oxide semiconductor (CMOS) image sensor, which attains an increased number of pixels, addition reading or thin-out reading has been used as a technique of performing high frame rate reading.

Among these techniques, the addition reading method has been commonly used because of its advantage of increasing a signal to noise ratio (also referred to as an SN ratio hereinafter).

Using the addition reading, however, naturally causes lowering the resolution compared to a method of reading all the photo receiving pixels separately.

Meanwhile, folding distortion may occur more frequently in image data obtained by the thin-out reading method than in the addition reading method. Accordingly, however, an effect of improving the resolution increases by a technology such as super resolution technology.

An SN ratio, however, is more largely reduced when the thin-out reading is used than using the addition reading. Deterioration of the SN ratio may stand out very much particularly when the intensity of illumination is low.

It has been proposed, therefore, to switch between the thin-out reading and the addition reading, as needed, to thereby balance between resolution and SN ratio (see Patent Document 1).

In another approach, an imaging device which includes a color filter array of a novel color arrangement to allow increase of sensitivity with the minimum decrease in resolution has also been proposed (see Patent Documents 2 and 3).

CITATION LIST

Patent Document

Patent Document 1: JP 2011-097568 A
Patent Document 2: JP 4626706 B
Patent Document 3: JP 2006-033454 A

SUMMARY OF THE INVENTION

Problems to be Solved by the Invention

The addition processing, however, of the technique disclosed in Patent Document 2 uses the counter that has been disclosed in Patent Document 3 to perform pixel addition during analogue to digital (AD) conversion, which makes the processing time of the AD conversion nearly twice as long as the time taken without addition processing. As a result, there has been an obstacle in realizing a high frame rate even when the technique of Patent Document 2 is used.

The present technique has been made in view of the above situations and is particularly directed to restrict reduction of the SN ratio, minimize decrease of resolution, and improve sensitivity of pixel signals by high speed processing.

Solutions to Problems

According to a first aspect of the present technique, an imaging device includes
pixels arranged on a two dimensional matrix,
a color filter of a predetermined color component of a luminance signal for the pixels,
color filters of other color components than the predetermined color of the luminance signal for the pixels, and
a signal processing unit configured to add signals together of the pixels to which the color filter of the predetermined color component is provided to output an addition result, and thin out signals of the pixels to which the color filters of other color components are provided to output a thinned out result.

The signal processing unit may be configured to use a correlation between the signals having been added and output of the pixels to which the color filter of the predetermined color component is provided and the signals having been thinned out and output of the pixels to which the color filters of other color components are provided.

The signal processing unit then generates the signals having been thinned out and output of the pixels to which the color filters of other color components are provided.

The predetermined color component may be white color, and the other color components may be red, green, and blue colors.

The predetermined color component may be green color, and the other color components may be red and blue colors.

The signal processing unit may thin out the signals of the pixels provided with the color filters of other color components and output the thinned-out result during a first period of either a former half or a latter half of a period when the signals of the pixels arranged in the same row are output. The signal processing unit may then add the signals together of the pixel provided with the color filter of the predetermined color component and an adjacent pixel, which is arranged in a row different from the same row and provided with the color filter of the predetermined color component, and output an addition result during a second period different from the first period.

The signal processing unit may thin out the signals of the pixels provided with the color filters of other color components and output the thinned-out result during the first period of either the former half or the latter half of the period when the signals of the pixels arranged in the same row are output. The signal processing unit may then add the signals together of the pixel provided with the color filter of the predetermined color component and the adjacent pixel, which is arranged in the row different from the same row and provided with the color filter of the predetermined color component, and output the addition result during the second period different from the first period. Accordingly, the signals are output in the same order as that of signal processing where thin-out reading alone is performed without addition and outputting processing.

The signal processing unit may thin out the pixels provided with the color filters of other color components by doubling gain of each signal and output the thinned-out result during the first period of either the former half or the latter half of the period when the signals of the pixels arranged in the same row are output. The signal processing unit may then add the signals together of the pixel provided with the color filter of the predetermined color component and the adjacent pixel, which is arranged in the row different from the same row and provided with the color filter of the predetermined color component, with each signal having even gain, and output the addition result during the second period different from the first period.

The signal processing unit may thin out the pixels provided with the color filters of other color components by doubling gain of each signal and outputs the thinned-out result during the first period of either the former half or the latter half of the period when the signals of the pixels arranged in the same row are output. The signal processing unit may then add the signals together of the pixel provided with the color filter of the predetermined color component and the adjacent pixel, which is arranged in the row different from the same row and provided with the color filter of the predetermined color component, with each signal having even gain, and output the addition result during the second period different from the first period. Accordingly, the signal is output in such a manner that a range of analogue to digital (AD) conversion of the signal of the pixel is suitably changed.

The signal processing unit may perform floating diffusion (FD) addition of the signals of the pixels provided with the color filter of the predetermined color component, and outputs an addition result.

The signal processing unit may perform source follower addition of the signals of the pixels provided with the color filter of the predetermined color component, and outputs an addition result.

The signal processing unit may use a correlation between the signals having been added and output of the pixels to which the color filter of the predetermined color component is provided and the signals having been thinned out and output of the pixels to which the color filters of other color components are provided. The signal processing unit may then generate the signals having been thinned out and output of the pixels to which the color filters of other color components are provided. Accordingly, a signal to noise (SN) ratio of the signals of the pixels having been thinned out and output can be reduced.

According to the first aspect of the present technique, an imaging method of an imaging device including
pixels arranged on a two dimensional matrix,
a color filter of a predetermined color component of a luminance signal for the pixels, and
color filters of other color components than the predetermined color of the luminance signal for the pixels,
the imaging method including
adding signals together of the pixels to which the color filter of the predetermined color component is provided to output an addition result, and
thinning out signals of the pixels to which the color filters of other color components are provided to output a thinned out result.

According to the first aspect of the present technique, a program in a computer configured to control an imaging device including
pixels arranged on a two dimensional matrix,
a color filter of a predetermined color component of a luminance signal for the pixels, and
color filters of other color components than the predetermined color of the luminance signal for the pixels, wherein the program causes the computer to perform
adding signals of the pixels provided with the color filter of the predetermined color component to output an addition result, and
thinning out signals of the pixels provided with the color filters of other color components to output a thinned out result.

According to a second aspect of the present technique, an electronic device including
pixels arranged on a two dimensional matrix,
a color filter of a predetermined color component of a luminance signal for the pixels,
color filters of other color components than the predetermined color of the luminance signal for the pixels, and
a signal processing unit configured to add signals of the pixels provided with the color filter of the predetermined color component to output an addition result, and thin out signals of the pixels provided with the color filters of other color components to output a thinned out result.

According to the first and second aspects of the present technique, an imaging device or an electronic device includes pixels arranged on a two dimensional matrix, a color filter of a predetermined color component of a luminance signal for the pixels, color filters of other color components than the predetermined color of the luminance signal for the pixels. In the imaging device or the electronic device, signals of the pixels provided with the color filter of the predetermined color component are added and output, and signals of the pixels provided with the color filters of other color components are thinned out and output.

The imaging device or the electronic device of the present technique may be an independent device or equipment, or may be implemented as a block for performing imaging processing.

Effects of the Invention

According to an aspect of the present technique, it is possible to restrict the lowering of the SN ratio, minimize the decrease of resolution, and perform high speed processing to improve the sensitivity of pixel signals.

MODE FOR CARRYING OUT THE INVENTION

An embodiment for implementing the present invention (referred to as an embodiment hereinafter) will be described below. The description will be provided in the following order.

1. A first embodiment (an example using a pixel arrangement in which the main color is white color and the sub-colors are red, green, and blue colors)

2. A first modification (an example of the case where the main color is green color, and the sub-colors are red and blue colors)

3. A second modification (an example using a pixel arrangement in which the main color is white color, and the sub-colors are red, green, and blue colors, with green pixels arranged at every other pixel in both horizontal and vertical directions)

<First Embodiment>
[Exemplary Structure of Embodiment of Imaging Device]

Figure 1:
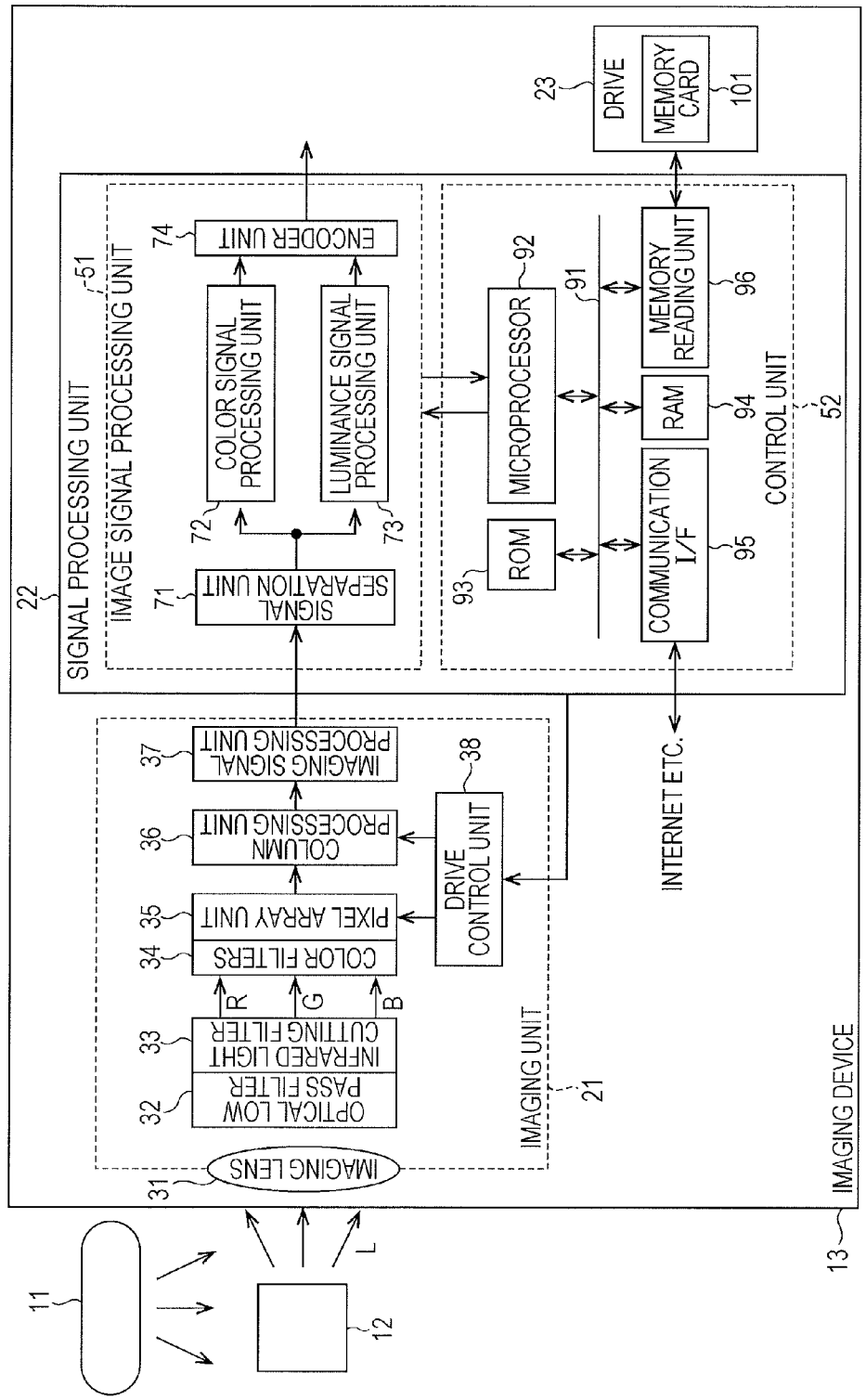
FIG. 1 is a block diagram illustrating an exemplary structure of an imaging device to which the present technique is applied according to an embodiment.

FIG. 1 is a block diagram illustrating an exemplary structure of an imaging device to which the present technique is applied according to a first embodiment. The imaging device of FIG. 1 takes an image to be output as an image signal formed by a digital signal, and records the image signal in, for example, removable media.

An imaging device 13 of FIG. 1 includes an imaging unit 21 configured to take a color image, which is formed by visible light, to be output as an image signal, and a signal processing unit 22 configured to perform signal processing of the image signal received from the imaging unit 21 and record the image signal in removable media 101, while controlling the operation of the imaging unit 21.

More specifically, the imaging unit 21 is a so-called complementary metal oxide semiconductor (CMOS) image sensor including an imaging lens 31, an optical low pass filter 32, an infrared light cutting filter 33, color filters 34, a pixel array unit 35, a column processing unit 36, an imaging signal processing unit 37, and a drive control unit 38.

The imaging lens 31 is configured as an optical system for taking image information to guide light L, which bears an image of an object 12 placed under a light source 11, such as solar light or light of a fluorescent lamp, toward the imaging device 13 to form an image. The optical low pass filter 32 smooths incident light from the imaging lens 31 for each pixel, and ejects resulting light toward the infrared light cutting filter 33. The infrared light cutting filter 33 cuts infrared components of the incident light from the optical low pass filter 32 and ejects resulting light toward the color filters 34.

The color filters 34 are two-dimensionally arranged color filters of red, green, and blue (RGB) colors, or RGB with white (W: White) color, through which light is transmitted while receiving each type of colors, and is ejected toward the pixel array unit 35. Regarding white color, a transparent filter is provided herein as a color filter for white color. It is understood, however, that the filter itself may not be provided so as to form the structure as if the white filter is functioning.

Figure 2:
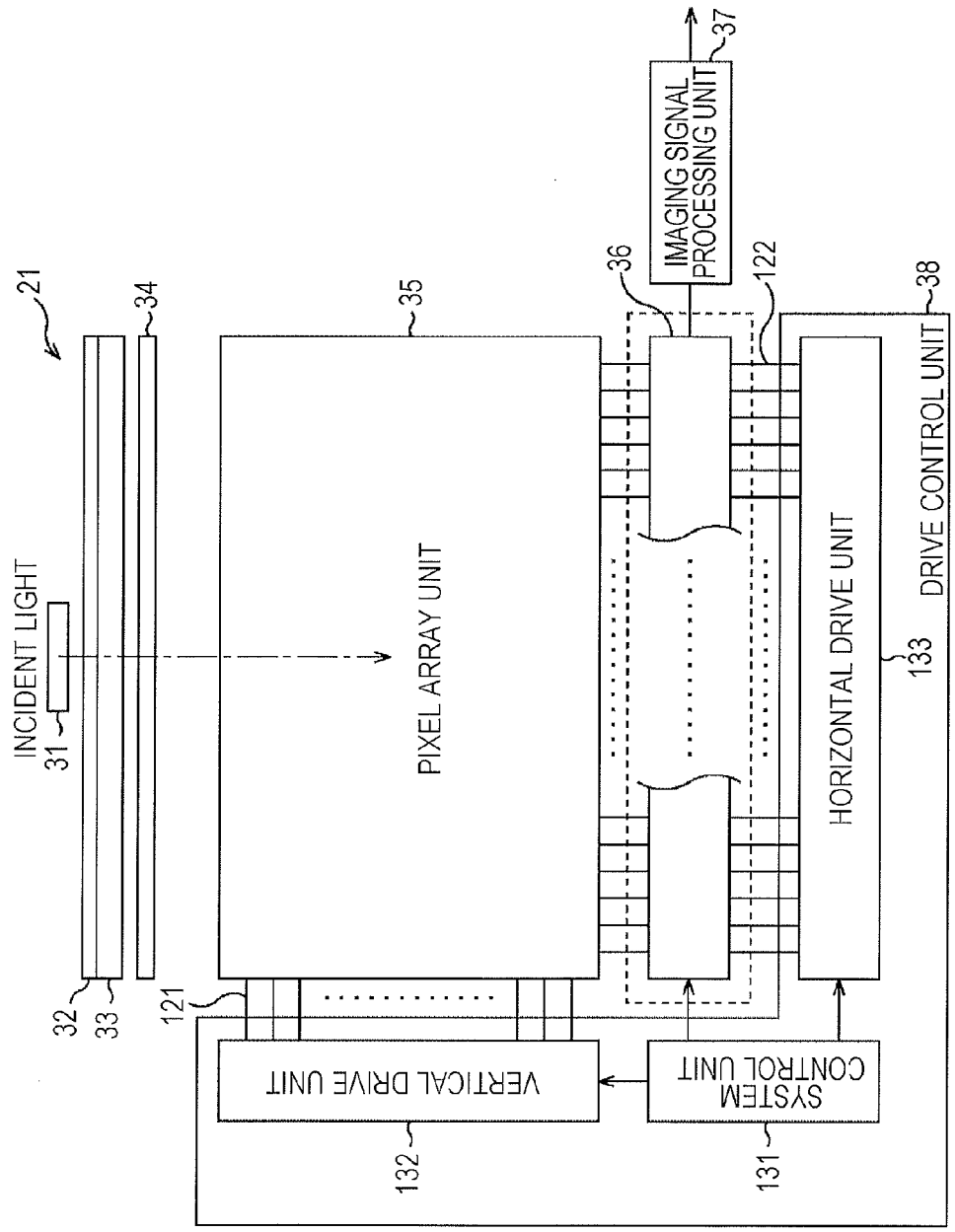
FIG. 2 is an explanatory diagram of an exemplary structure of an imaging unit of FIG. 1.

The pixel array unit 35 includes unit pixels (simply also referred to as pixels hereinafter) 151, which will be described later by referring to FIGS. 3, 4, arranged two-dimensionally in a matrix. The pixels include photoelectric conversion elements that convert incident visible light into electric charges corresponding to the amount of light. As illustrated in FIG. 2, the pixel array unit 35 includes pixels arranged in a matrix. In the drawing, pixel driving lines 121 are arranged for each row in a lateral direction (direction in which pixel rows are arranged, or horizontal direction), and vertical signal lines 122 are arranged for each column in a vertical direction (direction in which pixel columns are arranged, or vertical direction).

In FIG. 2, the pixel driving lines 121 are illustrated as a single line, but it is not limited to the single line. The pixel array unit 35 outputs pixel signals stored as electric charges by the photoelectric conversion elements to a column processing unit 36. Specific structure of unit pixels will be described in detail below by referring to FIGS. 3, 4.

In the imaging signal processing unit 37, a group of four pixels is made to function as shared pixels, and pixel signals are read by combining thin-out reading and addition reading, which will be described later by referring to FIG. 4. The imaging signal processing unit 37 lowers resolution according to the pixel signals having been read in this manner, while reproducing the pixels having been thinned out and read to improve the SN ratio and output resulting pixel signals to a signal processing unit 22.

The drive control unit 38 controls the operation of the pixel array unit 35. More particularly, the drive control unit 38 includes a system control unit 131, a vertical drive unit 132, and a horizontal drive unit 133, as illustrated in FIG. 2.

The vertical drive unit 132 is formed by a shift register, an address decoder, etc. The vertical drive unit 132 includes a read scanning system and a sweep scanning system, although specific structures thereof are not shown. The read scanning system performs selective scanning of unit pixels, from which the signals are read, sequentially for each row. Meanwhile, the sweep scanning system performs sweep scanning relative to rows to be read, to which the read scanning is performed by the read scanning system, in such a manner that unnecessary electric charges are swept (reset) from the photoelectric conversion elements of the unit pixels of the row to be read, prior to the read scanning, by the time equivalent to a shutter speed. By this sweeping (resetting) of unnecessary electric charges by the sweep scanning system, a so-called electronic shutter operation is performed. The electronic shutter operation refers to an operation in which optical charges of the photoelectric conversion elements are discarded and new exposure is started (storage of optical charge is started).

Signals to be read by the read operation of the read scanning system correspond to the optical amount of the incident light having been received after the read operation immediately before it or after the electronic shutter. Thus, a period between the reading timing by the immediately before the operation or the sweeping timing by the electronic shutter operation and the reading timing by the read operation this time is regarded as the storage time (exposure time) of the optical charge of the unit pixels.

Signals are output from respective unit pixels of the pixel rows after selective scanning by the vertical drive unit 132, and supplied to the column processing unit 36 through each of the vertical signal lines 122. The column processing unit 36 performs predetermined signal processing on analog pixel signals output from each pixel of the selected rows for each pixel column of the pixel array unit 35. The column processing unit 36 takes the reset level and the signal level output from each pixel of the selected row by correlated double sampling (CDS) processing, and determines a difference of the levels to determine the pixel signal for each row, while removing the fixed pattern noise of the pixels. To convert analogue pixel signals to digital signals, the column processing unit 36 may include, as needed, an analogue to digital (AD) conversion function. In the following description, the column processing unit 36 of FIG. 1 is regarded as having the AD conversion function.

The horizontal drive unit 133 is formed by a shift register or an address decoder to perform selective scanning of the circuit portions one after another corresponding to the pixel rows of the column processing unit 36. By the selective scanning by the horizontal drive unit 133, the pixel signals, which have been subjected to signal processing for each row of pixels in the column processing unit 36, are sequentially output.

The imaging signal processing unit 37 performs signal processing corresponding to the color arrangement of the color filters 34, such as the Bayer arrangement, which is output from each pixel of the pixel array unit 35. Specific signal processing in the imaging signal processing unit 37 will be described in detail later by referring to FIG. 5.

The Bayer arrangement refers to a color arrangement in which a color, or a main color, representing the main component of the luminance signal which requires high resolution is arranged in a checkerboard pattern, while two or three kinds of colors, or sub-colors, representing color components which relatively do not require high resolution, are arranged in the remaining portions. Basic form of the Bayer arrangement is, for example, color coding of the color arrangement in which green color pixels (G pixels) are arranged as the main color which largely contribute to the luminance signals, while red color pixels (R pixels) and blue color pixels (B pixels) are arranged as the sub-colors in the checkerboard pattern in the remaining portions. Another color coding of the color arrangement, in which the main color representing the main component is white color arranged in a checkerboard pattern, and red color pixels (R pixels), green color pixels (G pixels), and blue color pixels (B pixels) are arranged in a checkerboard pattern in the remaining portions, may also be provided.

The system control unit 131 receives clock signals supplied from the outside, data for ordering the operation mode, etc., and outputs data such as internal information of the imaging unit 21 formed by the CMOS image sensor. The system control unit 131 further includes a timing generator that generates various timing signals, and controls driving of the vertical drive unit 132, the horizontal drive unit 133, the column processing unit 36, and the imaging signal processing unit 37 according to the various timing signals generated by the timing generator.

The signal processing unit 22 includes an image signal processing unit 51 and a control unit 52 that functions as a main control unit to control the entire operation of the imaging device 13. The image signal processing unit 51 includes a signal separation unit 71, a color signal processing unit 72, a luminance signal processing unit 73, and an encoder unit 74.

The signal processing unit 71 has a primary color separating function to separate the digital imaging signal supplied from the AD conversion circuit of the column processing unit 36 into a red color pixel signal (R pixel signal), a green color pixel signal (G pixel signal), and a blue color pixel signal (B pixel signal) when color filters other than primary color filters are used as the color filters 34. The color signal processing unit 72 performs signal processing regarding color signals according to the R, G, and B pixel signals separated by the signal separation unit 71. The luminance signal processing unit 73 performs signal processing regarding luminance signals Y according to R, G, and B pixel signals that are primary color signals separated by the signal separation unit 71. The encoder unit 74 generates the image signals according to a luminance signal/color signal.

The control unit 52 is configured to control the entire operation of the imaging device 13. More particularly, the control unit 52 includes a microprocessor (microprocessor) 92, a read only memory (ROM)93, a random access memory (RAM) 94, a communication interface (I/F) 95, and a reading unit 96, which are connected to a bus 91. The microprocessor 92 is the center of an electronic computer, and is represented by a central processing unit (CPU) in which calculation and control functions to be performed by the computer are integrated in a very small integrated circuit.

The microprocessor 92 controls the entire operation of the control unit 52 by properly reading programs and data stored in the ROM 93 configured as a non-volatile storage unit, while developing the programs and data to the RAM 94 configured as a volatile storage unit, and performing a program for on and off timing setting of various control pulses or a program for exposure control.

The program for exposure control performed when the microprocessor 92 functions as an exposure condition control unit for controlling exposure conditions includes, for example, calculations of photometric data according to the luminance based signal from the luminance signal processing unit 73 (e.g., calculation of an average value of a photometry area of predetermined size and position), and luminance level determination according to the calculation result (whether the result is higher or lower than an middle level).

In the above, the "volatile storage unit" refers to the storage unit configured to delete stored contents when the power source of the device is turned off. In contrast, the "non-volatile storage unit" refers to the storage unit configured to maintain stored contents even when the main power source of the device is turned off. Any storage unit may be used so long as the stored contents can be maintained. The storage unit is not limited to the one in which a memory element made of a semiconductor material has, in itself, a non-volatile characteristic. Alternatively, a backup power source may be provided to a storage unit so as to lead the volatile memory element to behave as if it has the "non-volatile characteristic".

Removable media 101 mounted on a drive 23 is used to register various setting value data, such as program data that cause the microprocessor 92 to perform software processing, a converging range of photometric data according to the luminance based signals from the luminance signal processing unit 73, and on and off timing of various control pulses for exposure control processing (including controlling the electronic shutter).

The reading unit 96 stores (installs) data read from the removable media 101 mounted on the drive 23 to the RAM 93. The communication I/F 95 mediates delivery of communication data to and from a communication network such as the Internet.

In this type of imaging device 13, the drive control unit 38 and the column processing unit 36 are provided separately from the pixel array unit 35 as a module. It is needless to say, however, that these units may be formed integrally on the same semiconductor substrate with the pixel array unit 35 as one chip.

Further, as illustrated in FIGS. 1, 2, the imaging device 13 includes the imaging lens 31, the optical low pass filter 32, or other optical systems such as the infrared light cutting filter 33, in addition to the pixel array unit 35, the drive control unit 38, the column processing unit 36, and the signal processing unit 22. Such a configuration is preferable when these units are packaged together to have the imaging function.

In the context of modules in the solid state image sensor, as illustrated in the drawings, the pixel array unit 35 and the signal processing unit (except for the signal processing unit 22 in the post stage of the column processing unit 36), which is closely associated with the pixel array unit 35 side, such as the column processing unit 36 including the AD conversion function and the difference (CDS) processing function, may be packaged together to form a module having the imaging function to be provided in the solid state image sensor. In the post stage of such the solid state image sensor provided in the form of modules, the signal processing unit 22, which is the remaining portion of the signal processing unit, may be provided to form the entire imaging device 13.

Alternatively, the solid state image sensor may be provided in the form of the module having the imaging function, although it is not illustrated, in such a manner that the pixel array unit 35 and the optical system such as the imaging lens 31 are packaged together, and the signal processing unit 22 is also provided in the module in addition to such a solid state image sensor provided in the form of the module, to thereby form the entire imaging device 13.

Further, as the form of the module in the solid state image sensor, a structure corresponding to the signal processing unit 22 may be included. In this case, the solid state image sensor can substantially be regarded as identical to the imaging device 13.

Such an imaging device 13 is provided as, for example, a camera or a portable device having the imaging function to perform "imaging". The "imaging" is not limited to taking images during normal photographing with cameras, and may also include, in a broad sense, finger print detection or the like.

Therefore, the imaging device 13 of the above structure includes all functions of the above mentioned solid state image sensor, and the basic structure and operation may be the same as those of the above mentioned solid state image sensor.

[Exemplary Structure of Unit Pixel]

Next, a circuit structure constituting a unit pixel will be described below by referring to FIG. 3.

Figure 3:
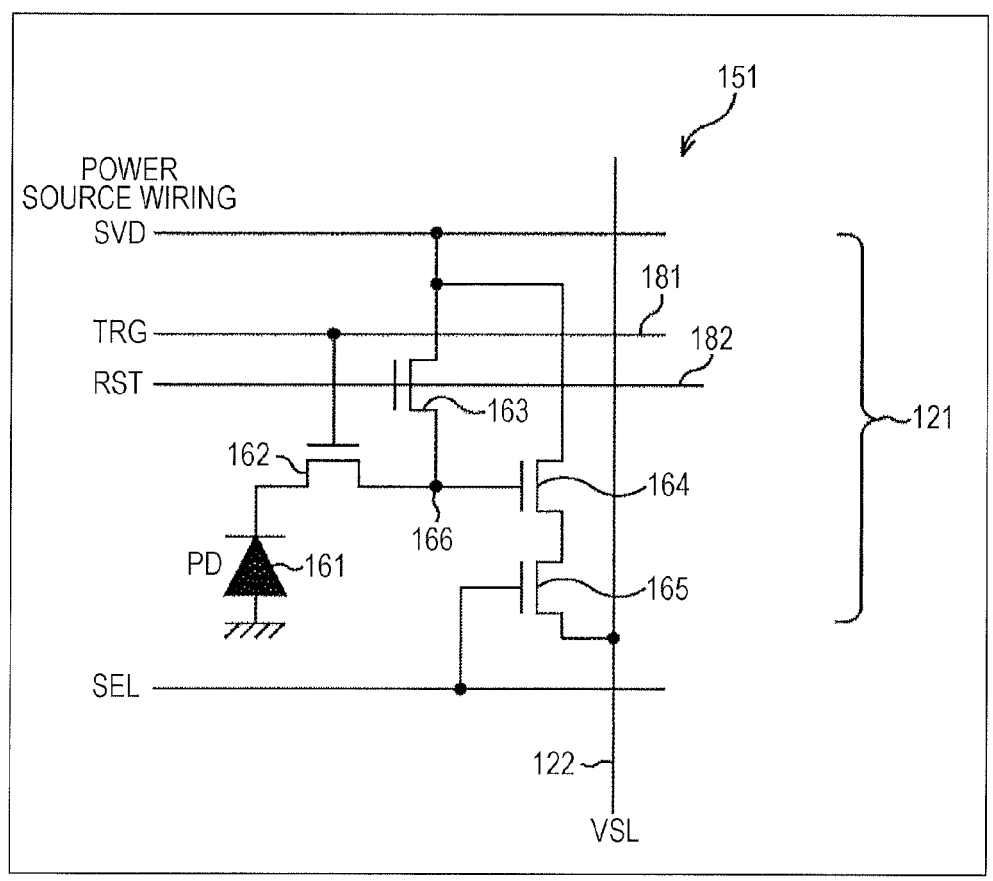
FIG. 3 is an explanatory diagram of an exemplary structure of a unit pixel of FIG. 2.

A unit pixel 151 of FIG. 3 includes four transistors formed by a photo diode 161 configured as a photoelectric conversion element, a transfer transistor 162, a reset transistor 163, an amplification transistor 164, and a selection transistor 165.

N-channel MOS transistors are used and described herein as examples of the four transfer transistors 162, the reset transistor 163, the amplification transistor 164, and the selection transistor 165, but other transistor structures may also be used. Specifically, a combination of conductive types of the transfer transistor 162, the reset transistor 163, the amplification transistor 164, and the selection transistor 165, as illustrated herein, is just an example, and the combination is not limited thereto.

For the unit pixel 151, pixel driving lines 121, such as three drive wirings including a transfer line 181, a reset line 182, and a select line 183 are commonly provided for each pixel of the same pixel row. One end of the transfer line 181, the reset line 182, and the select line 183, respectively, is connected to an output terminal of the vertical drive unit 132 for and corresponding to each pixel row.

An anode electrode of the photo diode 161 is connected to a negative side power source (e.g., ground) to allow photoelectric conversion of received light into optical electric charges (which are photoelectrons in this case) corresponding to the amount of light. A cathode electrode of the photo diode 161 is electrically connected to a gate electrode of the amplification transistor 164 via the transfer transistor 162. A node that is electrically connected to the gate electrode of the amplification transistor 164 is referred to as a floating diffusion (FD) unit 166.

The transfer transistor 162 is connected between the cathode electrode of the photo diode 161 and the FD unit 166. A high level (e.g., a pixel power source SVD level) active (written as "high active" hereinafter) transfer pulse TRG is supplied to the gate electrode of the transfer transistor 162 via the transfer line 181. Upon receiving the transfer pulse TRG, the transfer transistor 162 is turned on and transfers the optical charge provided by photoelectric conversion in the photo diode 161 to the FD unit 166.

The reset transistor 163 has its drain electrode connected to the pixel power source SVD and its source electrode connected to the FD unit 166. A high active reset pulse RST is supplied to the gate electrode of the reset transistor 163 via the reset line 182, prior to the transfer of the signal charge from the photo diode 161 to the FD unit 166. Upon receiving the reset pulse RST, the reset transistor 163 is turned on, and resets the FD unit 166 by discarding the electric charges of the FD unit 166 to the pixel power source SVD.

The amplification transistor 164 has its gate electrode connected to the FD unit 166 and its drain electrode connected to the pixel power source SVD. The amplification transistor 164 outputs the potential of the FD unit 166 after resetting by the reset transistor 163 as a reset signal (reset level) Vreset. The amplification transistor 164 further outputs the potential of the FD unit 166 after the transfer of the signal charge by the transfer transistor 162 as an optical storage signal (signal level) Vsig.

The selection transistor 165 has, for example, its drain electrode connected to the source electrode of the amplification transistor 164, and its source electrode connected to the vertical signal line 122. A high active selection pulse SEL is supplied to the gate electrode of the selection transistor 165 via the select line 183. Upon receiving the selection pulse SEL, the selection transistor 165 is turned on such that the unit pixel 151 is regarded as being in the selected state, and the signal output from the amplification transistor 164 is relayed to the vertical signal line 122.

Another circuit structure in which the selection transistor 165 is connected between the pixel power source SVD and the drain of the amplification transistor 164 may also be possible.

The pixel structure of the unit pixel 151 is not limited to the above structure formed by the four transistors. For example, the pixel structure may include three transistors, with one used as both the amplification transistor 164 and the selection transistor 165, and any pixel circuit structure may be used therefor.

[Shared Pixel Structure]

Meanwhile, during moving image taking, it is a common practice to perform pixel additions in which adjacent pixel signals are added and read in order to increase the frame rate. The pixel additions are allowed in the pixels, on the signal lines, in the column processing unit 36, and the post stage signal processing unit 22. Next, therefore, by referring to FIG. 4, an example of shared pixel structure in which signals of four pixels arranged vertically and horizontally adjacent to each other are added in the pixels will be described below.

Figure 4:
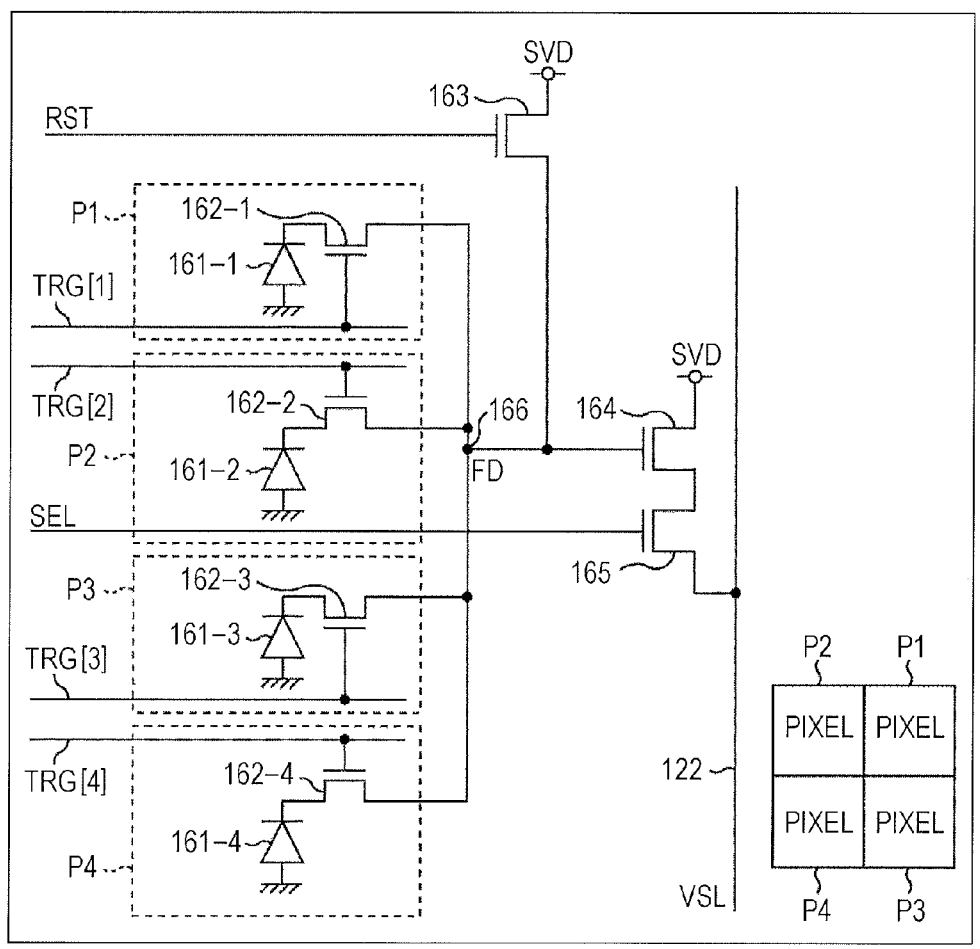
FIG. 4 is an explanatory diagram of a shared pixel structure.

FIG. 4 illustrates a circuit structure, that is, an example of shared pixel structure in the case where pixel values are read for four adjacent pixels in the pixels. In FIG. 4, similar names and reference sings are given to constituent elements having the same functions as those of FIG. 3, and the description thereof will be omitted accordingly. A pixel arrangement of four pixels includes, for example, pixels P1 to P4, as illustrated in the lower right side of FIG. 4.

Specifically, four photo diodes 161 arranged vertically and horizontally adjacent to each other are referred to as photo diodes 161-1 to 161-4. For these photo diodes 161-1 to 161-4, four transfer transistors 162-1 to 162-4 are individually provided. One each of the reset transistor 163, the amplification transistor 164, and the selection transistor 165 are provided for the four photo diodes 161-1 to 161-4 and the transfer transistors 162-1 to 162-4.

Specifically, each of the transfer transistors 162-1 to 162-4 has one electrode connected to the cathode electrode of the photo diodes 161-1 to 161-4, and the other electrode connected to the gate electrode of the amplification transistor 164. The gate electrode of the amplification transistor 164 is connected to the FD unit 166 commonly provided for the photo diodes 161-1 to 161-4. The reset transistor 163 has its drain electrode connected to the pixel power source SVD and its source electrode connected to the FD unit 166. The above constituent elements form the shared pixel structure of the four pixels corresponding to the pixels P1 to P4 as illustrated in the lower right side of FIG. 4. The pixels P1 to P4 correspond to the photo diodes 161-1 to 161-4 and the transfer transistors 162-1 to 162-4, respectively.

In the shared pixel structure of adjacent four pixels as illustrated in FIG. 4, transfer pulses TRG[1] to TRG[4] are supplied at the same timing as the four transfer transistors 162-1 to 162-4, respectively, to thereby realize pixel additions among the adjacent four pixels.

Specifically, the electric charges transferred from the photo diodes 161-1 to 161-4 to the FD unit 166 are regarded as being added in the FD unit 166 by the transfer transistors 162-1 to 162-4.

Meanwhile, the transfer pulses TRG[1] to TRG[4] may be supplied at different timing among the transfer transistors 162-1 to 162-4, respectively, to realize output of a signal for each pixel. Specifically, the pixel additions are performed when the moving image is taken to improve the frame rate, while the signals of all pixels are read independently to improve resolution when the still image is taken.

[Reading Signals with Shared Pixel Structure of Four Pixels]

Next, by referring to FIG. 5, pixel signal reading procedures using the shared pixel structure of four pixels, which has been explained by referring to FIG. 4, will be described.

Figure 5:
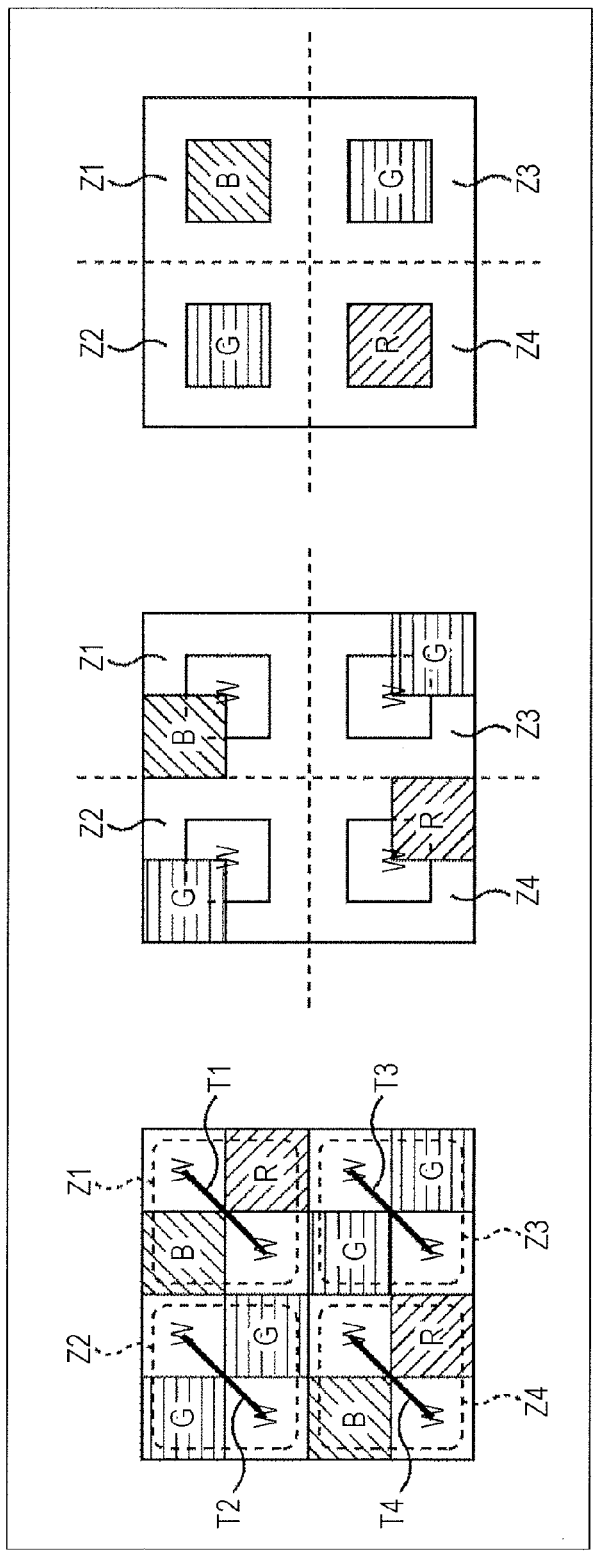
FIG. 5 is an explanatory diagram of a reading method of pixel signals using the shared pixel structure.

In FIG. 5, four color filters of white, red, green, and blue colors are used among the color filters 34, which are written as W, R, G, and B in the drawing. In addition, pixels provided with individual color filters of white, red, green and blue colors will also be referred to hereinafter as W, R, G, and B pixels, respectively. Further, in the description of the drawings, unless otherwise noted, a background of W pixel is represented by white color, a background of R pixel is represented by hatched lines slanting downward to the right, a background of G pixel is represented by horizontal stripe, and a background of B pixel is represented by hatched lines slanting upward to the right.

In this case, the color arrangement is formed by a checkerboard pattern of W pixels and diagonal arrangement of G pixels slanting from the upper left corner toward the lower right corner, as illustrated in the leftmost side of FIG. 5 by a total of sixteen pixels of vertical four pixels by horizontal four pixels.

B pixels are arranged at the second pixel from the right on the top stage and at the second pixel from the bottom in the leftmost column. Further, R pixels are arranged at the second pixel from the top in the rightmost column and at the second pixel from the left on the bottom stage. At this time, the four pixels in a region Z1 placed on the upper right corner of the sixteen pixels forms a shared pixel structure. Other regions Z2 to Z4 also have the shared pixel structures. Accordingly, W, B, R, and W pixels are arranged in the region Z1 corresponding to the pixels P1 to P4 of FIG. 4. Similarly, corresponding to the pixels P1 to P4, W, G, G, and W pixels are arranged in the region Z2, W, G, G, and W pixels are arranged in the region Z3, and W, B, R, and W pixels are arranged in the region Z4.

At this time, B and G pixels arranged on the top stage among a total of sixteen pixels, which are formed by vertical four pixels by horizontal four pixels, are subjected to thin-out reading, as first processing, without pixel additions. Regarding these B and G pixels arranged on the top stage, the pixel signals are read when the transfer pulse TRG[2] is simultaneously supplied to the transfer transistor 162-2 of both B and G pixels of the regions Z1, Z2 in the pixel arrangement illustrated in FIG. 4.

Next, as second processing, two W pixels arranged diagonally right and left are subjected to the pixel addition and read as a pixel signal of W pixel at a gravity-center position of each of the regions Z1 to Z4. Specifically, as illustrated in the left side of FIG. 5, the W pixels tied by straight lines T1 to T4, respectively, are subjected to the pixel additions and read.

Regarding the additions of the W pixels, two pixels are added in the FD unit 166 when the transfer pulses TRG[1], TRG[4] are supplied simultaneously to the two transfer transistors 162-1, 162-4 of the pixels to be added in the pixel arrangement illustrated in FIG. 4. Such a pixel addition will be referred to as FD addition hereinafter.

Further, as third processing, R and G pixels arranged on the bottom stage, among a total of sixteen pixels of vertical four pixels by horizontal four pixels, are subjected to thin-out reading without pixel additions.

Regarding the R and G pixels on the bottom stage, the pixel signals are read when the transfer pulse TRG[3] is simultaneously supplied to the transfer transistor 162-3 of both R and G pixels of the regions Z3, Z4 in the pixel arrangement illustrated in FIG. 4.

Specifically, by the processing so far, the signals of R pixel in the region Z1, G pixel on the lower stage of the region Z2, G pixel on the lower stage of the region Z3, and R pixel of the region Z4, respectively, have not been read. That is, the pixel signals of one pixel each of the shared pixel structure of four pixels have not been used in the regions Z1 to Z4. Accordingly, sensitivity of R, B, and G pixels is decreased and the SN ratio is lowered compared to the case where W pixels are read by pixel additions.

Next, as illustrated in the center of FIG. 5, fourth processing is performed for each of the regions Z1 to Z4. A correlation among W, R, B, and G pixels is taken, where W pixels have been read as the pixel signals at the gravity-center positions of individual regions, according to the pixel positions and values. According to a determined correlation, fitting is performed on the pixel signals at the gravity-center positions of the regions Z1 to Z4 to generate four pixel signals of RGB Bayer arrangement, as illustrated in the right side of FIG. 5.

Thus, the pixel addition processing can be used to convert and output the signals corresponding to the color arrangement including a checkerboard pattern of W pixels into the signals corresponding to the RGB Bayer arrangement.

[Pixel Signal Reading Processing]

Next, by referring to a flowchart of FIG. 6, pixel signal reading processing will be described. This processing explains the pixel signal reading processing in the case of the pixel arrangement formed by a total of sixteen pixels of vertical four pixels by horizontal four pixels, as illustrated in the left part of FIG. 5. Therefore, other pixels of the pixel array unit 35 of FIG. 2 are supposed to be processed similarly for the pixel unit of a total of sixteen pixels of vertical four pixels by horizontal four pixels.

In the following, the pixel arrangement illustrated in the left side of FIG. 5 includes white color arranged in a checkerboard pattern and the white color will also be referred to as the main color. Other colors including red, green, and blue colors will also be referred to as sub-colors. Further, the regions Z1, Z2 of FIG. 5 will be referred to as an upper stage of the region formed by a total of sixteen pixels of vertical four pixels by horizontal four pixels. Similarly, the regions Z3, Z4 will be referred to as a lower stage. For the regions Z1 to Z4, the corresponding pixels P1, P2 illustrated in the lower right corner of FIG. 4 will be referred to as an upper row of each of the regions Z1 to Z4, and the pixels P3, P4 will be referred to as a lower row.

Figure 7:
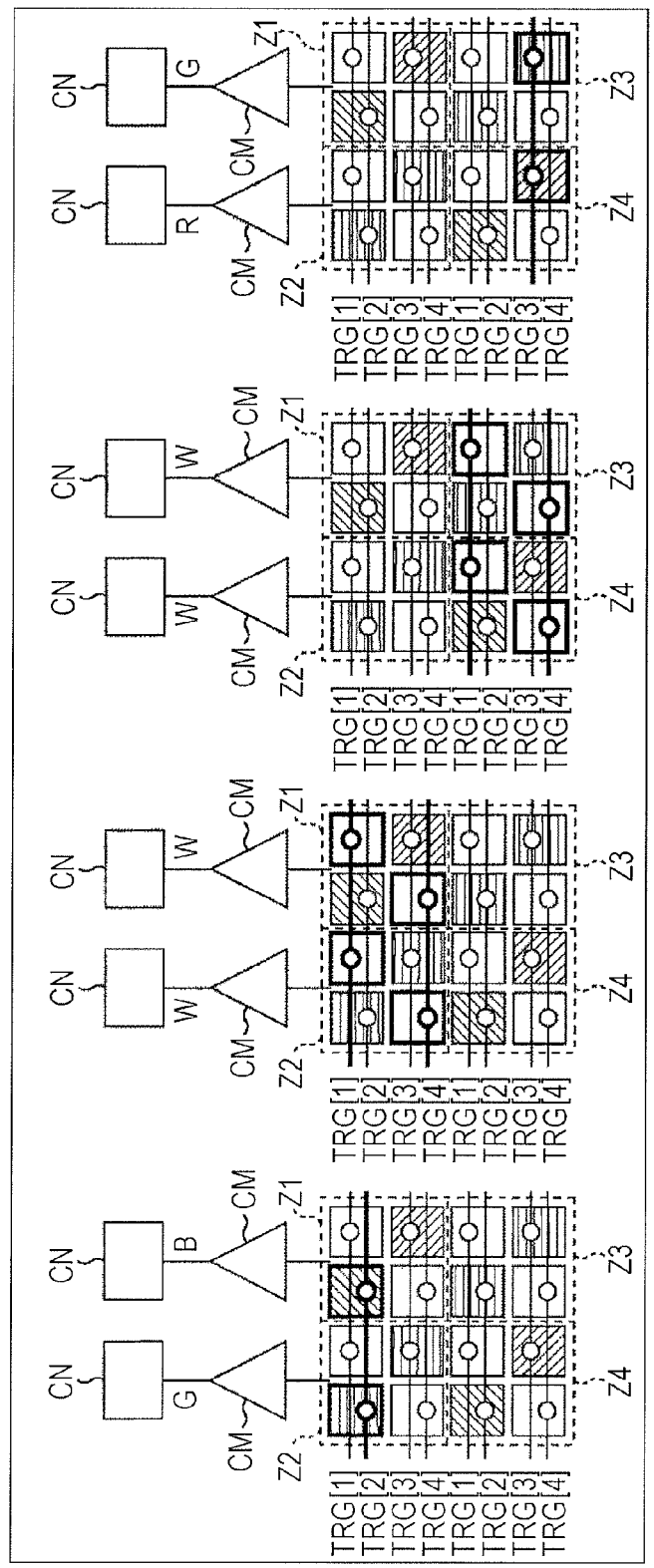
FIG. 7 is an explanatory diagram of the pixel signal reading processing.

In step S11, the vertical drive unit 132 of the drive control unit 38 generates the transfer pulse TRG[2] via the transfer line 181 of the pixel driving lines 121 in the regions Z1, Z2 corresponding to the upper stage, as illustrated in the leftmost side of FIG. 7, to thereby cause the sub-color pixel signals in the upper row to be read. Specifically, the arrangement of pixels illustrated in the leftmost side of FIG. 7 is similar to the arrangement of the sixteen pixels illustrated in the leftmost side of FIG. 5. Circular marks on the pixels indicate the pixels to which the transfer pulses TRG[1] to TRG[4], which are supplied on the transfer line 181 of individual pixels P1 to P4 in the shared pixel arrangement of four pixels, are supplied.

Specifically, it is illustrated in FIG. 7 that the transfer pulse TRG[1] is supplied when the pixel signal of the pixel P1 in each of the regions Z1 to Z4 illustrated in the leftmost side of FIG. 5 is transferred. In the leftmost side of FIG. 7, therefore, the transfer pulse TRG[1] causes the pixel signals of W pixels to be read corresponding to each of the regions Z1 to Z4 of FIG. 5. Similarly, the transfer pulse TRG[2] causes B, G, G, and B pixels to be read corresponding to the pixel P2 of the regions Z1 to Z4. The transfer pulse TRG[3] causes R, G, G, and R pixels corresponding to the pixel P3 of the regions Z1 to Z4 to be read. The transfer pulse TRG[4] causes W pixels to be read corresponding to the pixel P4 of the regions Z1 to Z4. CM represents the amplification transistor 164 of each shared pixel structure, and CN represents each vertical signal line 122.

In step S11, therefore, upon generation of the transfer pulse TRG[2] for the upper row of the upper stage regions Z1, Z2, the sub-colors, i.e., G and B pixels that correspond to the pixel P2 of FIG. 4 are read. The sub-colors of G and B pixels having been read are supplied to the column processing unit 36 via the vertical signal lines 122, and sequentially provided to the imaging signal processing unit 37. In FIG. 7, the pixels whose pixel signals are to be read are surrounded by bold lines.

In step S12, the vertical drive unit 132 of the drive control unit 38 generates the transfer pulses TRG[1], TRG[4] via the transfer line 181 of the pixel driving lines 121 in the upper stage regions Z1, Z2, as illustrated in the second part from the left of FIG. 7, to perform addition reading of two pixel signals of W pixels, which are the main color pixels corresponding to the pixels P1, P4. Specifically, in this case, the pixel signals of two pixels are simultaneously read to perform the FD addition, and an addition result is transferred to the imaging signal processing unit 37.

In step S13, the vertical drive unit 132 of the drive control unit 38 generates the transfer pulses TRG[1], TRG[4] via the transfer line 181 of the pixel driving lines 121 in the lower stage regions Z3, Z4, as illustrated in the second part from the right of FIG. 7. Accordingly, the two pixel signals of W pixels, which are the main color pixels corresponding to the pixels P1, P4, are subjected to the addition reading. Specifically, in this case, the pixel signals of two pixels are simultaneously read to perform the FD addition, and an addition result is transferred to the imaging signal processing unit 37.

In step S14, the vertical drive unit 132 of the drive control unit 38 generates the transfer pulse TRG[3] via the transfer line 181 of the pixel driving lines 121 in the regions Z3, Z4 corresponding to the lower stage, as illustrated in the rightmost side of FIG. 7, to thereby cause the pixel signals of R and G pixels, which are the sub-color pixels in the lower row, to be read and transferred to the imaging signal processing unit 37.

In step S15, the imaging signal processing unit 37 takes a correlation between W pixels determined as the main color pixels and the sub-colors determined in each of the regions Z1 to Z4, as illustrated in the center of FIG. 5. The colors of each region are then subjected to fitting, as illustrated at the right part of FIG. 5. Specifically, as illustrated in the right side of FIG. 5., the imaging signal processing unit 37 uses a directional correlation to calculate the pixel signal for each region in developing the components of W pixels to the pixels of other colors. A technique for calculating the pixel signals using the directional correlation is disclosed in, for example, JP 4683121 B where a plurality of color signals corresponding to a specific pixel is obtained to determine a correlation value in a vertical direction and/or a horizontal direction at a position corresponding to the specific pixel.

Specifically, as illustrated in the center part and in the right side of FIG. 5, the imaging signal processing unit 37 replaces W pixels with G pixels according to the correlation between W pixels and G pixels. As apparent from the color pixel arrangement illustrated in the left side of FIG. 5, W pixels and G pixels are adjacent to each other. When the correlation between W pixels and G pixels is considered in a given region, a quite strong correlation is obtained at a correlation value (correlation function) of nearly 1, as both pixels can be the main color components of luminance signals. By using the color correlation, therefore, the imaging signal processing unit 37 determines the direction of resolution and replaces W pixels with G pixels by converting the output level of W pixels into the level equivalent to the level of G pixels.

In addition, as illustrated in the right side of FIG. 5, R pixels and B pixels are generated for the Bayer arrangement according to the correlation between W pixels and R pixels and between W pixels and B pixels. Specifically, since W pixels include individual color components of R, G, and B pixels, it is possible to take the correlation between individual pixels of W pixels and R pixels, and between W pixels and B pixels. In this signal processing, a technique disclosed in, for example, JP 2005-160044 A can be used for interpolating all pixels by the luminance signal to be replaced by G pixels in the four color arrangement.

In step S16, the imaging signal processing unit 37 completes the Bayer arrangement including R, G, and B pixels determined above, and supplies as the pixel signals to the signal processing unit 22.

By the above processing, both thin-out reading without pixel additions and addition reading with pixel additions are performed in the regions arranged in two rows horizontally, with each region formed by four pixels to constitute the shared pixel structure. Accordingly, the SN ratio can be improved by mostly the same reading procedures as in the case of performing the thin-out reading alone. Specifically, in the normal processing of performing thin-out reading alone, the leftmost side and the rightmost side of FIG. 8 corresponding to the processing of steps S11, S14 of the flowchart of FIG. 6 are similar to the processing of the case illustrated in FIG. 7.

Figure 6:
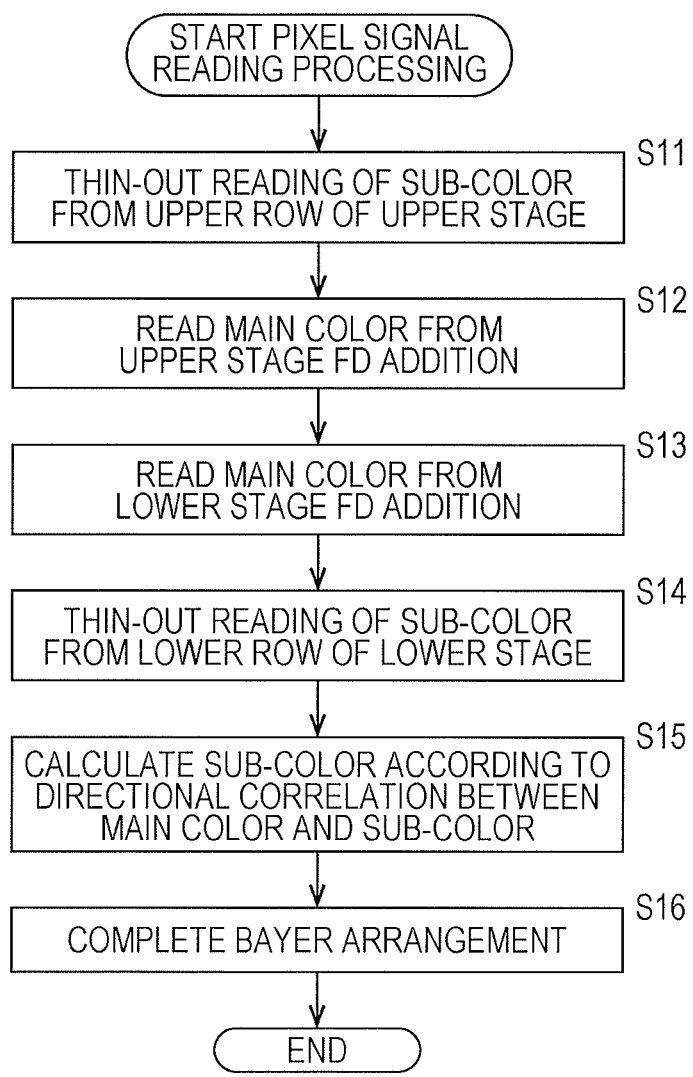
FIG. 6 is a flowchart for explaining pixel signal reading processing.
Figure 8:
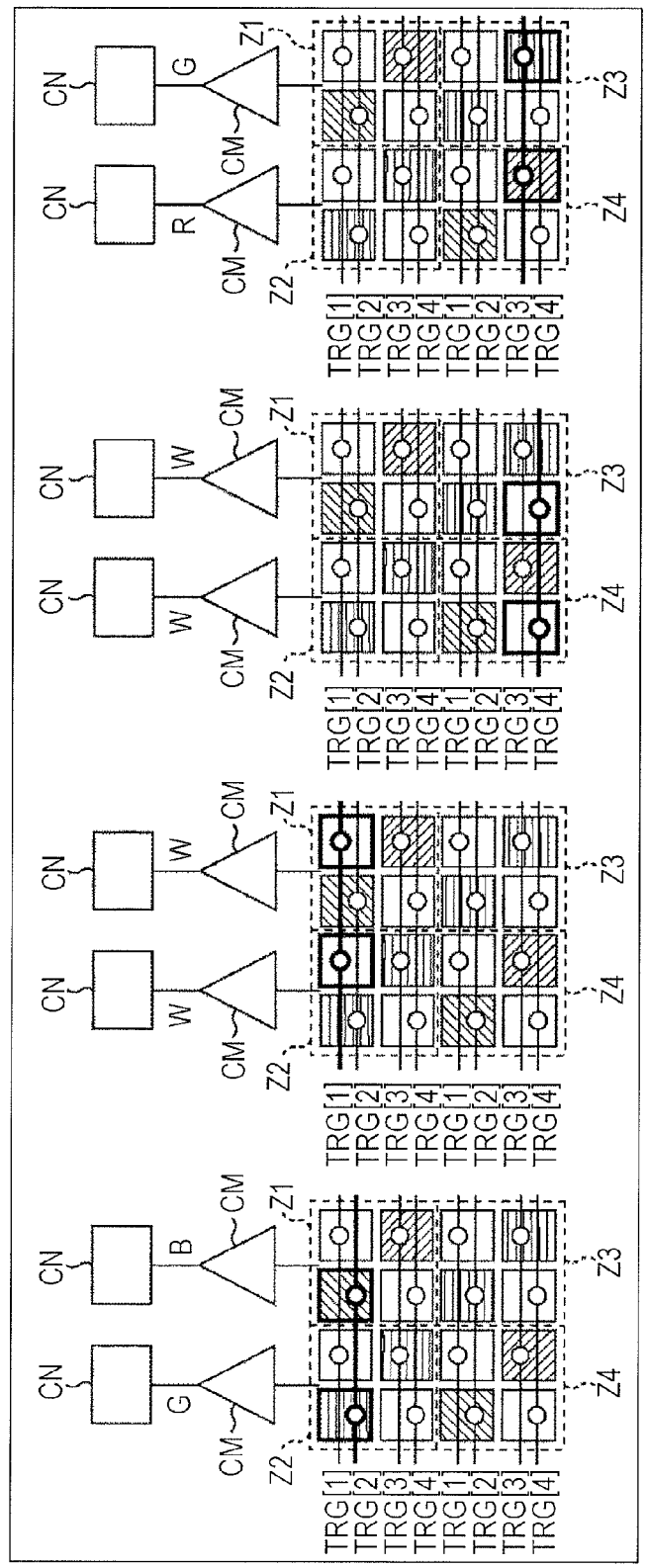
FIG. 8 is an explanatory diagram of a normal pixel signal reading processing.

However, as illustrated in the second and third parts from the left of FIG. 8 corresponding to the processing of steps S12, S13 of the flowchart of FIG. 6, the thin-out reading is performed only for the pixel signals corresponding to the pixel P1 in each of the regions Z1 to Z4, and the signals of the pixel P4 are not subjected to thin-out reading. In contrast, the above mentioned processing allows reading of the pixels in a manner that W pixels P1, P4, which are the main color pixels, are subjected to the pixel addition by the FD addition in each of the regions Z1 to Z4. Further, according to the correlation between the main color pixel signals, which have been subjected to the pixel addition by the FD addition, and the sub-color pixel signals of R, G, and B pixels in each of the regions Z1 to Z4, the pixel signals of the Bayer arrangement are determined for each of the regions Z1 to Z4, to allow improvement of the SN ratio by mostly the same reading procedures as in the case of performing the thin-out reading.

Figure 9:
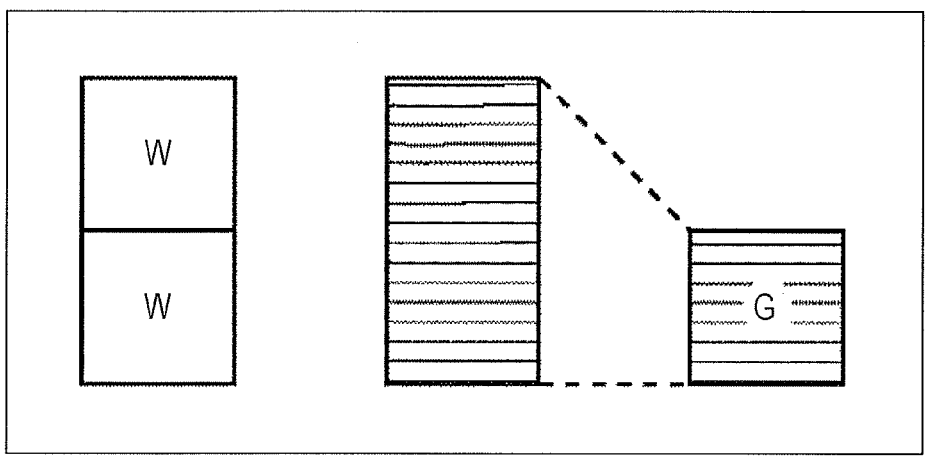
FIG. 9 is an explanatory diagram of an example of making a sub-color gain twice as high as a main color gain.

As illustrated in the left side of FIG. 9, the pixel signal equivalent to two pixels is read by the FD addition for the main color W pixels. For the sub-color pixels, such as G pixels, only the pixel signal equivalent to a single pixel is read, as illustrated in the right side of FIG. 9. Thus, the signal level of the main color pixel signal is twice as high as the signal level of the sub-color pixels. By doubling the sub-color pixel signals, however, to equalize mutual signal levels, the mutual correlation can be determined more precisely to achieve further improvement of the SN ratio.

<First Modification>

[Example of Green Color as the Main Color and Red and Blue Colors as Sub-Colors]

In the above description, the color filters 34 have been formed by the pixel arrangement of four pixels including W, R, G, and B pixels. Alternatively, similar effects can be obtained by the color filters 34 formed by the pixel arrangement of three pixels including R, G, and B pixels.

Figure 10:
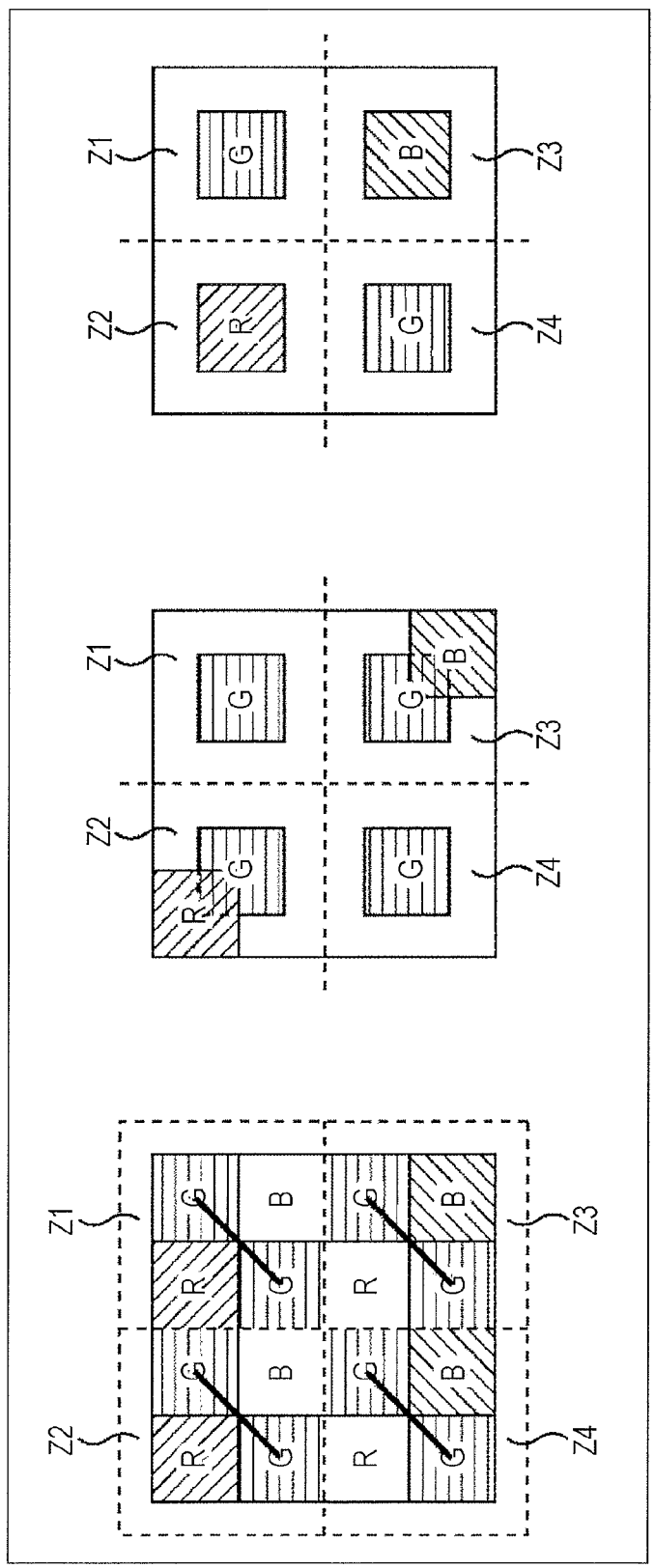
FIG. 10 is an explanatory diagram of an exemplary pixel arrangement when the main color is green color.
Figure 11:
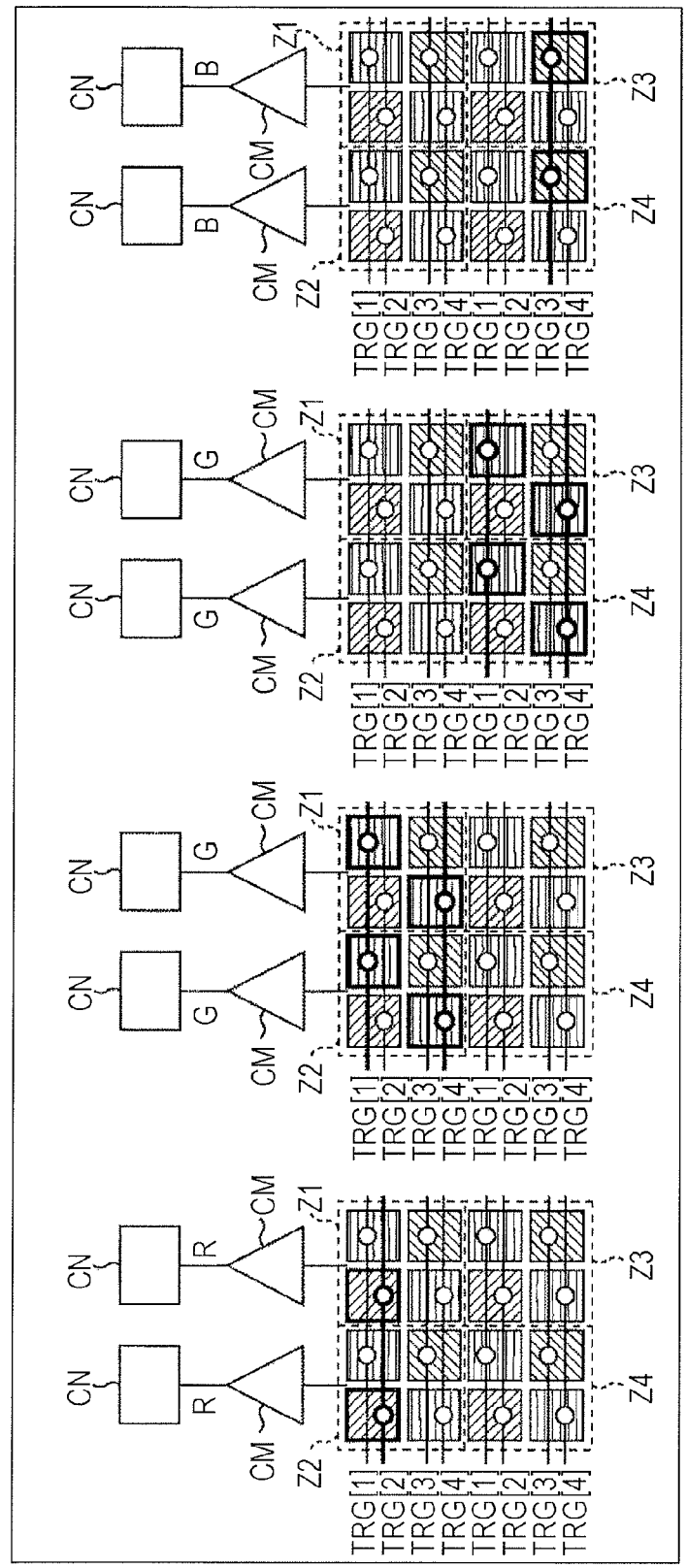
FIG. 11 is an explanatory diagram of a reading method of pixel signals in the exemplary pixel arrangement of FIG. 10.

FIGS. 10, 11 are explanatory diagrams of pixel signal reading procedures in the case where the pixel arrangement is formed by three color pixels including G pixels as the main color and R and B pixels as sub-colors.

Specifically, in this example, as illustrated in the left side of FIG. 10, the main color G pixels are arranged in a checkerboard pattern in pixels P1, P4 of the regions Z1 to Z4. R pixels are arranged in the pixel P2 and B pixels are arranged in the pixel P3 of each of the regions Z1 to Z4.

By the processing of step S11 in the flowchart of FIG. 6, R pixels in the pixel P2 of the regions Z1, Z2 are subjected to thin-out reading, as illustrated in the leftmost side of FIG. 11. By the processing of step S12, G pixels in the pixels P1, P4 of the regions Z1, Z2 are subjected to the FD additions and read, as illustrated in the second part from the left of FIG. 11. Further, by the processing of step S13, G pixels in the pixels P1, P4 of the regions Z3, Z4 are subjected to the FD additions and read, as illustrated second from the right of FIG. 11. By the processing of step S14, B pixels in the pixel P3 of the regions Z3, Z4 are subjected to the thin-out reading, as illustrated in the rightmost side of FIG. 11.

By the processing of step S15, as illustrated in the center of FIG. 10, according to the correlation between the pixel signals of G pixels, which have been read subsequent to the FD additions, and R pixels having been subjected to the thin-out reading from the pixel P2, R pixel is obtained by replacement in the region Z2, as illustrated in the right side of FIG. 10. Similarly, as illustrated in the right side of FIG. 10, B pixel is determined by replacement in the region Z3 according to the correlation between the pixel signals of G pixels having been subjected to the FD addition and read, and B pixels subjected to thin-out reading from the pixel P4. At this time, all the pixels in the regions Z1, Z4 are the main color G pixels, the pixel signals having been read are used without modification.

By a series of the above processing steps, the Bayer arrangement is obtained as illustrated in the right side of FIG. 10. Similarly to the above processing, the main color G pixels are read subsequent to the FD addition, even when the processing procedure is similar to the thin-out reading processing of the past, to allow increase of the SN ratio.

<Second Modification>

[Example of Pixel Arrangement with Green Pixels Arranged at Every Other Pixel in Horizontal and Vertical Directions, where the Main Color is White Color, and the Sub-Colors are Red, Green, and Blue Colors]

In the above description, the color filters 34 have been formed by the pixel arrangement of three pixels including R, G, and B pixels. Alternatively, similar effects can be obtained by the color filters 34 formed by the pixel arrangement of three pixels including R, G, and B pixels where the main color is W pixels and the sub-colors are R, G, and B pixels. W pixels are arranged in a checkerboard pattern, while G pixels are arranged at every other pixel in horizontal and vertical directions, and R and B pixels are arranged diagonally so as to sandwich G pixels. This pixel arrangement is a so-called white checkerboard with which similar effects can also be obtained.

Figure 12:
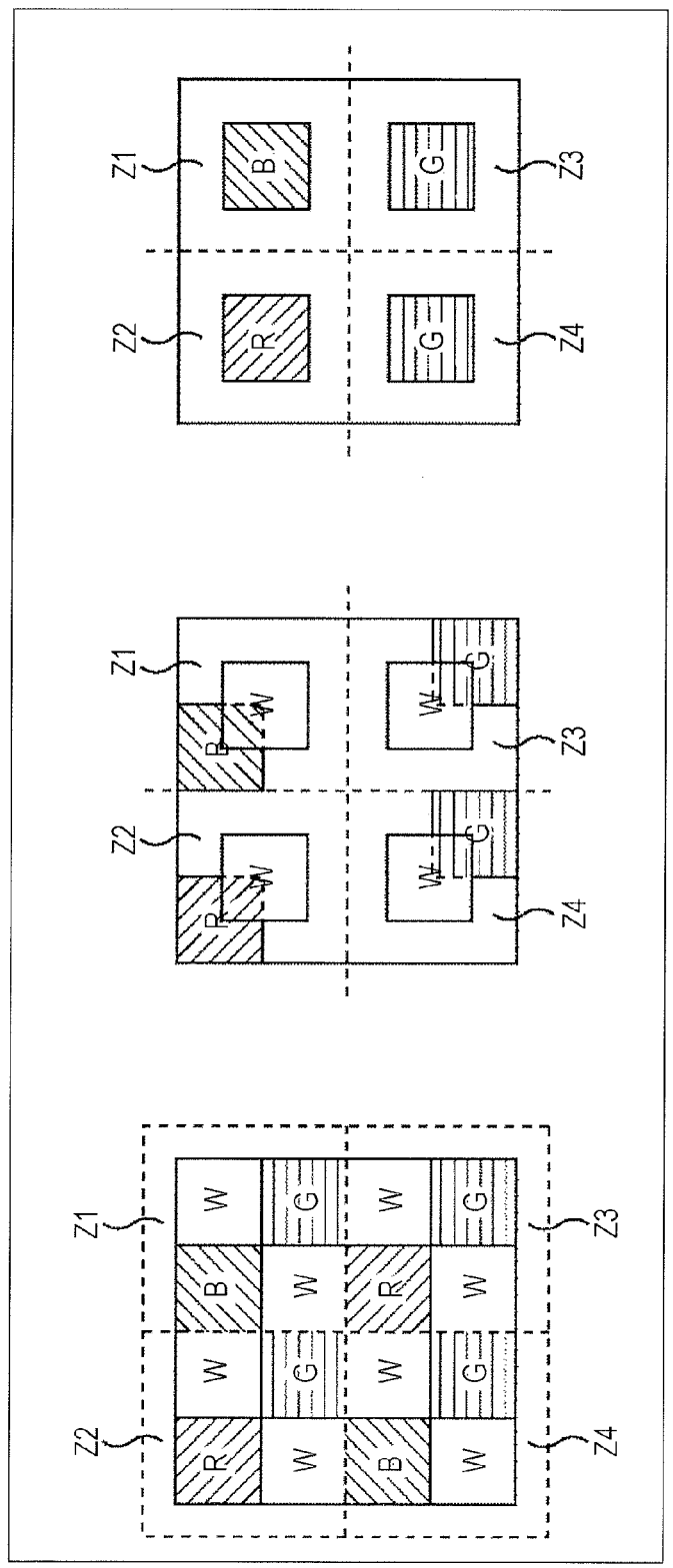
FIG. 12 is an explanatory diagram of an exemplary pixel arrangement of so-called checkerboard pattern.
Figure 13:
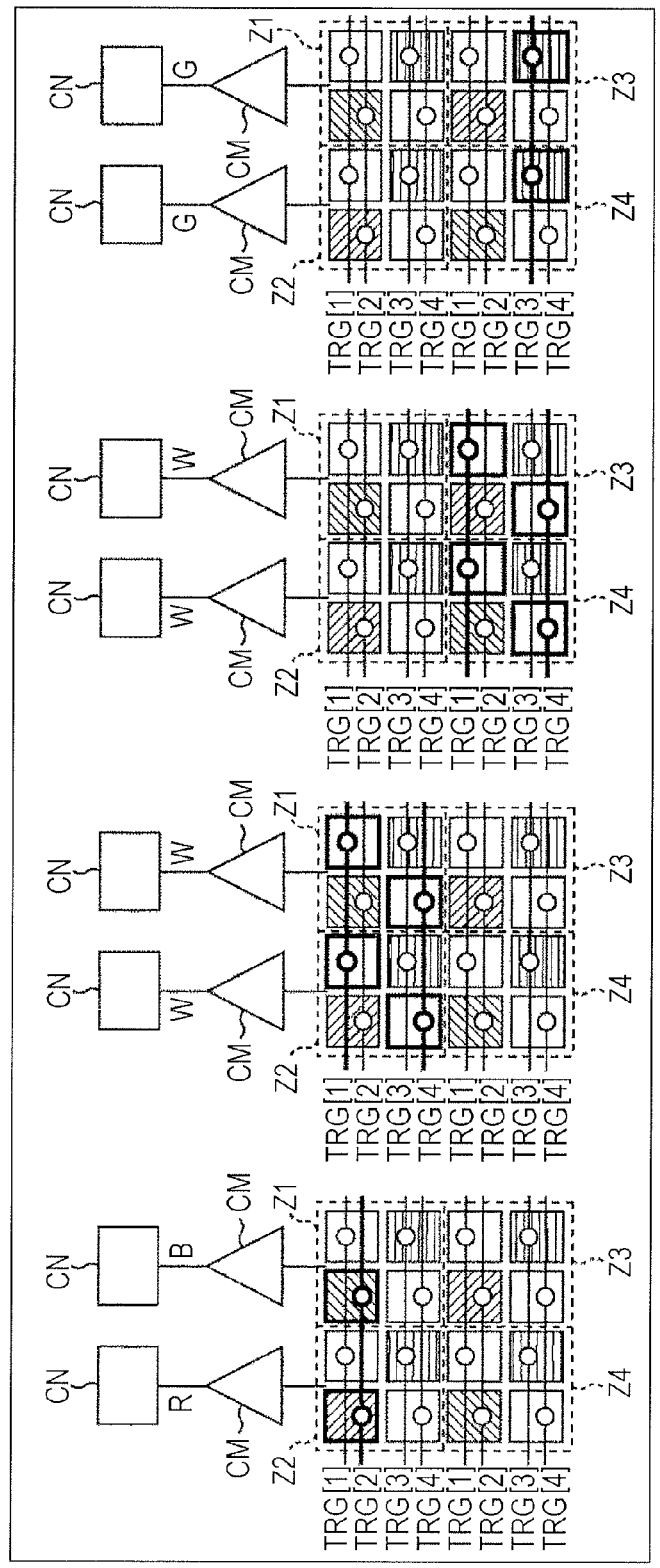
FIG. 13 is an exemplary diagram illustrating a reading method of pixel signals in the exemplary pixel arrangement of FIG. 12.

FIGS. 12, 13 are explanatory diagrams for explaining the reading procedures of the pixel signals when the pixel arrangement includes W, R, G, and B pixels, where the main color is W pixel and the sub-colors are three pixels of R, G, and B.

Specifically, as illustrated in the left side of FIG. 12, the main color W pixels are arranged in a checkerboard pattern at the pixels P1, P4 of the regions Z1 to Z4 in this example. B pixels are arranged at the pixel P2 of the regions Z1, Z4, G pixels are arranged at the pixel P3. R pixels are arranged at the pixel P2 of the regions Z2, Z3. G pixels are arranged at the pixel P3.

By the processing of step S11 in the flowchart of FIG. 6, R pixels and B pixels at the pixel P2 of the regions Z1, Z2 are subjected to the thin-out reading, as illustrated in the leftmost part of FIG. 13. By the processing of step S12, W pixels arranged at the pixels P1, P4 of the regions Z1, Z2 are read subsequent to the FD additions, as illustrated second from the left of FIG. 13. Further, by the processing of step S13, W pixels arranged at the pixels P1, P4 of the regions Z3, Z4 are read subsequent to the FD additions, as illustrated second from the right of FIG. 13. By the processing of step S14, G pixels arranged at the pixel P3 of each of the regions Z3, Z4 are subjected to the thin-out reading, as illustrated in the rightmost part of FIG. 13.

By the processing of step S15, as illustrated in the center of FIG. 12, according to the correlation between the pixel signals of W pixels, which have been read subsequent to the FD additions in the region Z1, and B pixels subjected to thin-out reading from the pixel P2, B pixel is obtained by replacement in the region Z1, as illustrated in the right side of FIG. 12. According to the correlation between the pixel signals of W pixels, which have been read subsequent to the FD additions in the region Z2, and R pixels subjected to thin-out reading from the pixel P2, R pixel is obtained by replacement in the region Z2, as illustrated in the right side of FIG. 12. Similarly, according to the correlation between the pixel signals of W pixels, which have been read subsequent to the FD additions in the regions Z3, Z4, and G pixels subjected to thin-out reading from the pixel P3, G pixel is obtained by replacement in the regions Z3, Z4, as illustrated in the right side of FIG. 12.

By a series of the above processing steps, the Bayer arrangement is obtained as illustrated in the right side of FIG. 12. In this processing, similarly to the above processing, the SN ratio can also be improved by the processing procedures similar to the thin-out reading of the past.

In the above, the FD additions have been used for pixel additions. Alternatively, other adding methods, such as source follower addition may be used so long as the addition of the pixel values can be performed.

As described above, in the procedures similar to the thin-out processing of the past, some of the signals are subjected to the addition reading to allow improvement of the SN ratio of the pixel signals.

The series of processing steps described above can be executed by hardware, but may also be executed by software. When the software is used to execute the series of processing steps above, a program constituting the software shall be installed from recording media to a computer with a dedicated hardware incorporated therein, or a computer such as a universal personal computer capable of executing various functions by installing various programs.

Figure 14:
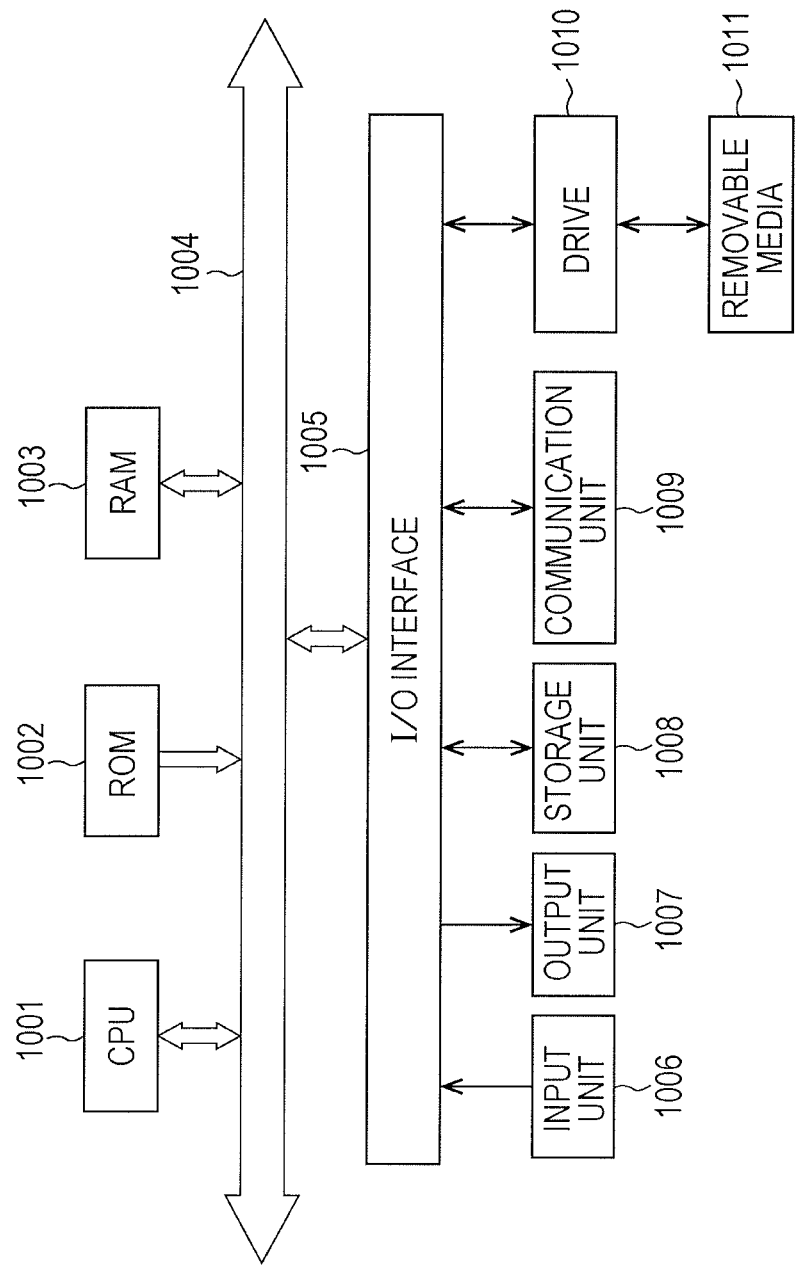
FIG. 14 is an explanatory diagram of an exemplary structure of a universal personal computer.

FIG. 14 illustrates an exemplary structure of a universal personal computer. The personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

The input/output interface 1005 is connected to an input unit 1006 formed by an input device, such as a keyboard or a mouse, to allow a user to input operation commands, an output unit 1007 configured to output a processing operation screen or an image of processing result, a storage unit 1008 formed by, for example, a hard disc drive which stores programs and various types of data, and a communication unit 1009 configured to execute communication processing via a network represented by the Internet by a local area network (LAN) adapter or the like. A drive 1010 configured to read and write data to and from removable media 1011, such as a magnetic disc (including flexible disc), an optical disc (including compact disc-read only memory (CD-ROM), a digital versatile disc (DVD)), an optical magnetic disc (including a mini disc (MD)), or a semiconductor memory, is also connected.

The CPU 1001 executes various types of processing according to programs stored in the ROM 1002, or other programs which have been read from the removable media 1011, such as the magnetic disc, the optical disc, the optical magnetic disc, or the semiconductor memory, installed in the storage unit 1008, and loaded from the storage unit 1008 to the RAM 1003. The RAM 1003 also stores data, etc. which are necessary for the CPU 1001 to execute various types of processing.

In the computer structured as above, the series of processing steps described above are executed by the CPU 1001 by, for example, loading and executing the program stored in the storage unit 1008 to the RAM 1003 via the input/output interface 1005 and the bus 1004.

The program executed by the computer (CPU 1001) may be provided as, for example, a recorded program in the removable media 1011 as package media, etc. The program can also be provided via wired or wireless transmission media, such as a local area network, the Internet, or digital satellite broadcasting.

In the computer, the program can be installed in the storage unit 1008 via the input/output interface 1005 by mounting the removable media 1011 on the drive 1010. The program can also be installed in the storage unit 1008 by receiving it by the communication unit 1009 via the wired or wireless transmission media. Alternatively, the program may be previously installed in the ROM 1002 or the storage unit 1008.

The program executable on a computer may be a program to be executed in time series in the order described in the present specification. Alternatively, the program may be processed in parallel or at necessary timing when, for example, the program is called.

In the specification, the system refers to a collection of a plurality of constituent elements (devices, modules (parts), etc.), and all constituent elements may or may not be provided in the same housing. Therefore, the system may be formed by a plurality of devices accommodated in separate housings and connected together via a network, or by a device including a plurality of modules accommodated in a single housing.

The embodiments of the present technique are not limited to the embodiments described above, and various changes may be made in a range without departing from the spirit of the present technique.

For example, the present technique may be implemented as cloud computing in which a single function is shared and collectively processed by a plurality of devices via a network.

The steps described in the above flowchart may be executed by a single device, or may be shared by a plurality of devices.

Further, if a step includes multiple processes, a single device may execute such multiple processes, or a plurality of devices may share the multiple processes.

The present technique can also be implemented by the following structures.

(1) An imaging device, including
pixels arranged on a two dimensional matrix,
a color filter of a predetermined color component of a luminance signal for the pixels,
color filters of other color components than the predetermined color of the luminance signal for the pixels, and
a signal processing unit configured to add signals together of the pixels to which the color filter of the predetermined color component is provided to output an addition result, and thin out signals of the pixels to which the color filters of other color components are provided to output a thinned out result.

(2) The imaging device according to (1) above, wherein
the signal processing unit uses a correlation between the signals having been added and output of the pixels to which the color filter of the predetermined color component is provided and the signals having been thinned out and output of the pixels to which the color filters of other color components are provided, and the signal processing unit then generates the signals having been thinned out and output of the pixels to which the color filters of other color components are provided.

(3) The imaging device according to (1) or (2), wherein
the predetermined color component is white color, and other color components are red, green, and blue colors.

(4) The imaging device according to (1) or (2), wherein
the predetermined color component is green color, and other color components are red and blue colors.

(5) The imaging device according to any one of (1) to (4), wherein
the signal processing unit
thins out the signals of the pixels provided with the color filters of other color components and outputs the thinned-out result during a first period of either a former half or a latter half of a period when the signals of the pixels arranged in the same row are output, and the signal processing unit
adds the signals together of the pixel provided with the color filter of the predetermined color component and an adjacent pixel, which is arranged in a row different from the same row and provided with the color filter of the predetermined color component, and outputs an addition result during a second period different from the first period.

(6) The imaging device according to any one of (1) to (5), wherein
the signal processing unit thins out the signals of the pixels provided with the color filters of other color components and outputs the thinned-out result during the first period of either the former half or the latter half of the period when the signals of the pixels arranged in the same row are output, and the signal processing unit then adds the signals together of the pixel provided with the color filter of the predetermined color component and the adjacent pixel, which is arranged in the row different from the same row and provided with the color filter of the predetermined color component, and outputs the addition result during the second period different from the first period, whereby the signals are output in the same order as that of signal processing where thin-out reading alone is performed without addition and outputting processing.

(7) The imaging device according to any one of (1) to (6), wherein
the signal processing unit
thins out the pixels provided with the color filters of other color components by doubling gain of each signal and outputs the thinned-out result during the first period of either the former half or the latter half of the period when the signals of the pixels arranged in the same row are output, and the signal processing unit then adds the signals together of the pixel provided with the color filter of the predetermined color component and the adjacent pixel, which is arranged in the row different from the same row and provided with the color filter of the predetermined color component, with each signal having even gain, and output the addition result during the second period different from the first period.

(8) The imaging device according to any one of (1) to (7) wherein
the signal processing unit
thins out the pixels provided with the color filters of other color components by doubling gain of each signal and outputs the thinned-out result, during the first period of either the former half or the latter half of the period when the signals of the pixels arranged in the same row are output, and the signal processing unit
adds the signals together of the pixel provided with the color filter of the predetermined color component and the adjacent pixel, which is arranged in the row different from the same row and provided with the color filter of the predetermined color component, with each signal having even gain, and outputs the addition result, during the second period different from the first period, whereby the signal is output in such a manner that a range of analogue to digital (AD) conversion of the signal of the pixel is suitably changed.

(9) The imaging device according to any one of (1) to (8) wherein
the signal processing unit performs floating diffusion (FD) addition of the signals of the pixels provided with the color filter of the predetermined color component, and outputs an addition result.

(10) The imaging device according to any one of (1) to (8) wherein
the signal processing unit performs source follower addition of the signals of the pixels provided with the color filter of the predetermined color component, and outputs an addition result.

(11) The imaging device according to any one of (1) to (10) wherein
the signal processing unit uses a correlation between the signals having been added and output of the pixels to which the color filter of the predetermined color component is provided and the signals having been thinned out and output of the pixels to which the color filters of other color components are provided, and the signal processing unit then generates the signals having been thinned out and output of the pixels to which the color filters of other color components are provided, whereby a signal to noise (SN) ratio of the signals of the pixels having been thinned out and output is reduced.

(12) An imaging method of an imaging device including
pixels arranged on a two dimensional matrix,
a color filter of a predetermined color component of a luminance signal for the pixels, and
color filters of other color components than the predetermined color of the luminance signal for the pixels,
the imaging method including
adding signals together of the pixels to which the color filter of the predetermined color component is provided to output an addition result, and
thinning out signals of the pixels to which the color filters of other color components are provided to output a thinned out result.

(13) A program in a computer configured to control an imaging device including
pixels arranged on a two dimensional matrix,
a color filter of a predetermined color component of a luminance signal for the pixels, and
color filters of other color components than the predetermined color of the luminance signal for the pixels, wherein the program causes the computer to perform
adding signals of the pixels provided with the color filter of the predetermined color component to output an addition result, and
thinning out signals of the pixels provided with the color filters of other color components to output a thinned out result.

(14) An electronic device including
pixels arranged on a two dimensional matrix,
a color filter of a predetermined color component of a luminance signal for the pixels,
color filters of other color components than the predetermined color of the luminance signal for the pixels, and
a signal processing unit configured to add signals of the pixels provided with the color filter of the predetermined color component to output an addition result, and thin out signals of the pixels provided with the color filters of other color components to output a thinned out result.

REFERENCE SIGNS LIST

21 Imaging unit
34 Color filters
35 Pixel array unit
36 Column processing unit
37 Imaging signal processing unit
38 Drive control unit
121 Pixel driving line
122 Vertical signal line
131 System control unit
132 Vertical drive unit
133 Horizontal drive unit
161,161-1 to 161-4 PD
162,162-1 to 162-4 Transfer transistor
163 Reset transistor
164 Amplification transistor
165 Selection transistor
166 FD

The invention claimed is:
1. An imaging device, comprising:
pixels arranged in a two dimensional matrix;
a main color filter of a predetermined color component of a luminance signal for the pixels;
additional color filters of other color components than the predetermined color of the luminance signal for the pixels; and
signal processing circuitry configured to, for the pixels in a subgroup of the matrix, thin out signals of the pixels to which the additional color filters are provided in a first half of the subgroup to output a first thinned out result, then add signals together of the pixels to which the main color filter is provided to output an addition result, and then thin out signals of the pixels to which the additional color filters are provided in a second half of the subgroup to output a second thinned out result.
2. The imaging device according to claim 1, wherein
the signal processing circuitry is configured to use a correlation between the signals having been added and output of the pixels to which the main color filter is provided and the signals having been thinned out and output of the pixels to which the additional color filters are provided, and
the signal processing circuitry is configured to generate the signals having been thinned out and output of the pixels to which the additional color filters are provided.

3. The imaging device according to claim 1, wherein
the predetermined color component is a white color, and other color components are red, green, and blue colors.
4. The imaging device according to claim 1, wherein
the predetermined color component is a green color, and other color components are red and blue colors.
5. The imaging device according to claim 1, wherein
the signal processing circuitry is configured to thin out the signals of the pixels provided with the additional color filters and to output the first thinned-out result during a first period of a former half of a period when the signals of the pixels arranged in the same row are output or to output the second thinned-out result during a second period of a latter half of the period when the signals of the pixels arranged in the same row are output, and
the signal processing circuitry is configured to then add the signals together of the pixel provided with the main color filter and an adjacent pixel, which is arranged in a row different from the same row and provided with the main color filter, and to output the addition result, during a third period different from the first period and the second period.
6. The imaging device according to claim 5, wherein
the signals are output in the same order as that of signal processing where thin-out reading alone is performed without addition and outputting processing.
7. The imaging device according to claim 1, wherein
the signal processing circuitry is configured to thin out the pixels provided with the additional color filters by doubling gain of each signal and to output the first thinned-out result during a first period of a former half of a period when the signals of the pixels arranged in the same row are output or to output the second thinned-out result during a second period of a latter half of the period when the signals of the pixels arranged in the same row are output, and
the signal processing circuitry is configured to then add the signals together of the pixel provided with the main color filter and an adjacent pixel, which is arranged in a row different from the same row and provided with the main color filter, with each signal having even gain, and to output the addition result during a third period different from the first period and the second period.
8. The imaging device according to claim 7, wherein
the signal is output in such a manner that a range of analogue to digital (AD) conversion of the signal of the pixel is suitably changed.
9. The imaging device according to claim 1, wherein
the signal processing circuitry is configured to perform floating diffusion (FD) addition of the signals of the pixels provided with the main color filter, and to output the addition result.
10. The imaging device according to claim 1, wherein
the signal processing circuitry is configured to perform source follower addition of the signals of the pixels provided with the main color filter, and to output the addition result.
11. The imaging device according to claim 2, wherein
a signal to noise (SN) ratio of the signals of the pixels having been thinned out and output is reduced.
12. The imaging device according to claim 1, wherein
the signal processing circuitry is configured to add signals together of the pixels to which the main color filter is provided in the first half of the subgroup to output a first addition result, and
the signal processing circuitry is then configured to add signals together of the pixels to which the main color filter is provided in the second half of the subgroup to output a second addition result.

13. The imaging device according to claim 1, wherein the signal processing circuitry is configured fit the first thinned out result and the second thinned out result at a gravity-center position of the addition result to generate a Bayer arrangement.

14. The imaging device according to claim 1, wherein the subgroup includes sixteen of the pixels in four neighboring rows and four neighboring columns.

15. An imaging method of an imaging device including pixels arranged in a two dimensional matrix, a main color filter of a predetermined color component of a luminance signal for the pixels, and additional color filters of other color components than the predetermined color of the luminance signal for the pixels, the imaging method comprising, for the pixels in a subgroup of the matrix:
    thinning out signals of the pixels to which the additional color filters are provided in a first half of a subgroup to output a first thinned out result,
    then adding signals together of the pixels to which the main color filter is provided to output an addition result; and
    then thinning out signals of the pixels to which the additional color filters are provided in a second half of the subgroup to output a second thinned out result.

16. A non-transitory computer-readable medium storing thereon a program that, when executed by a processor of a computer configured to control an imaging device including pixels arranged in a two dimensional matrix, a main color filter of a predetermined color component of a luminance signal for the pixels, and additional color filters of other color components than the predetermined color of the luminance signal for the pixels, causes the computer to perform operations comprising, for the pixels in a subgroup of the matrix:
    thinning out signals of the pixels provided with the additional color filters in a first half of a subgroup to output a first thinned out result,
    then adding signals of the pixels provided with the main color filter to output an addition result, and
    then thinning out signals of the pixels provided with the additional color filters in a second half of the subgroup to output a second thinned out result.

17. An electronic device, comprising:
    pixels arranged in a two dimensional matrix;
    a main color filter of a predetermined color component of a luminance signal for the pixels:
    additional color filters of other color components than the predetermined color of the luminance signal for the pixels; and
    signal processing circuitry configured to, for the pixels in a subgroup of the matrix, thin out signals of the pixels to which the additional color filters are provided in a first half of the subgroup to output a first thinned out result, then add signals of the pixels provided with the main color filter to output an addition result, and then thin out signals of the pixels provided with the additional color filters in a second half of the subgroup to output a second thinned out result.

* * * * *